United States Patent
Park et al.

(10) Patent No.: US 8,780,435 B2
(45) Date of Patent: Jul. 15, 2014

(54) ELECTROWETTING DISPLAY DEVICE AND METHOD OF MANUFACTURING THE SAME

(71) Applicant: Liquavista B.V., Eindhoven (NL)

(72) Inventors: DaeJin Park, Incheon (KR); Jung-Hun Noh, Gyeonggi-do (KR); Boram Lee, Gyeonggi-do (KR); Joonyoup Kim, Gyeonggi-do (KR); Donghwa Shin, Seoul (KR)

(73) Assignee: Liquavista B.V., Eindhoven (NL)

( * ) Notice: Subject to any disclaimer, the term of this patent is extended or adjusted under 35 U.S.C. 154(b) by 0 days.

(21) Appl. No.: 13/758,518

(22) Filed: Feb. 4, 2013

(65) Prior Publication Data

US 2013/0321894 A1    Dec. 5, 2013

(30) Foreign Application Priority Data

Jun. 5, 2012    (KR) .......................... 10-2012-0060573

(51) Int. Cl.
    *G02B 26/00*    (2006.01)
(52) U.S. Cl.
    USPC .......................................... 359/290; 359/292
(58) Field of Classification Search
    USPC .................................................. 359/290–295
    See application file for complete search history.

(56) References Cited

U.S. PATENT DOCUMENTS

| 5,403,437 | A | 4/1995 | Beratan et al. |
| 7,746,540 | B2 | 6/2010 | Lo et al. |
| 7,763,314 | B2 * | 7/2010 | Dai et al. ...................... 427/164 |
| 7,821,699 | B1 | 10/2010 | Lo et al. |
| 8,514,479 | B2 * | 8/2013 | Bae et al. ...................... 359/290 |
| 2008/0150423 | A1 | 6/2008 | Kim et al. |
| 2009/0027317 | A1 | 1/2009 | Cheng et al. |
| 2009/0046082 | A1 | 2/2009 | Jacobson et al. |
| 2009/0051632 | A1 | 2/2009 | Lee et al. |
| 2009/0051633 | A1 | 2/2009 | Yan et al. |
| 2009/0051672 | A1 | 2/2009 | Chen et al. |
| 2009/0058840 | A1 | 3/2009 | Lee et al. |
| 2009/0085909 | A1 | 4/2009 | Chen et al. |
| 2013/0242367 | A1 * | 9/2013 | Cho et al. ...................... 359/228 |

FOREIGN PATENT DOCUMENTS

| JP | 09-258184 | 10/1997 |
| JP | 2008-242247 | 10/2008 |
| JP | 2010-262309 | 11/2010 |
| KR | 10-2007-0113557 A | 11/2007 |
| KR | 10-2008-0042288 A | 5/2008 |
| KR | 10-2011-0057771 A | 6/2011 |
| KR | 10-2011-0074088 A | 6/2011 |
| KR | 10-2012-0010023 A | 2/2012 |

* cited by examiner

*Primary Examiner* — Mohammed Hasan
(74) *Attorney, Agent, or Firm* — Lee & Hayes, PLLC

(57) ABSTRACT

An electrowetting display device includes a base substrate, an electrowetting layer having first and second fluids immiscible with each other, a wall to define a pixel area, a hydrophobic layer in the pixel area, and an electronic device to control the electrowetting layer. A method of manufacturing the electrowetting display device is also provided.

20 Claims, 19 Drawing Sheets

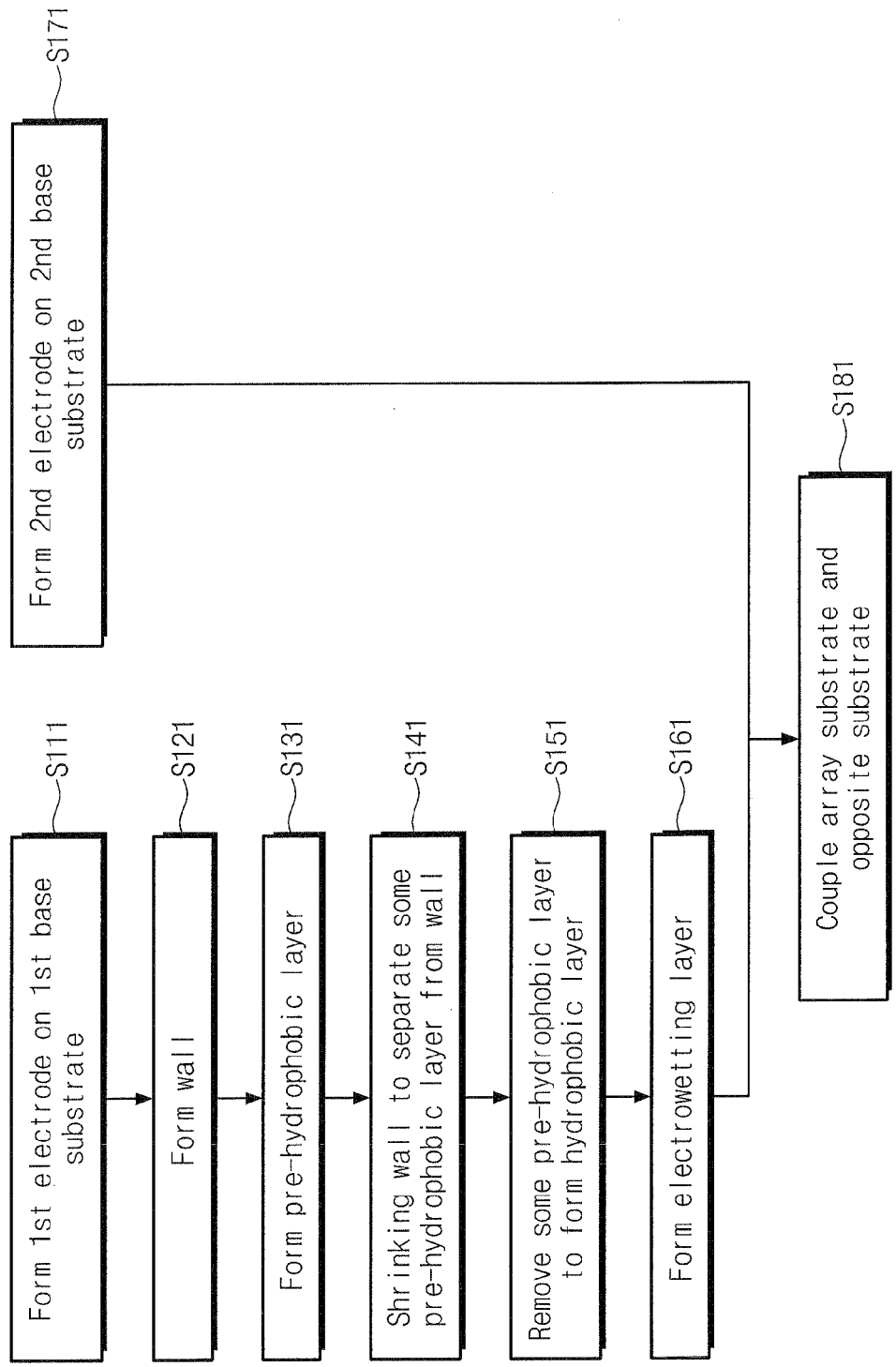

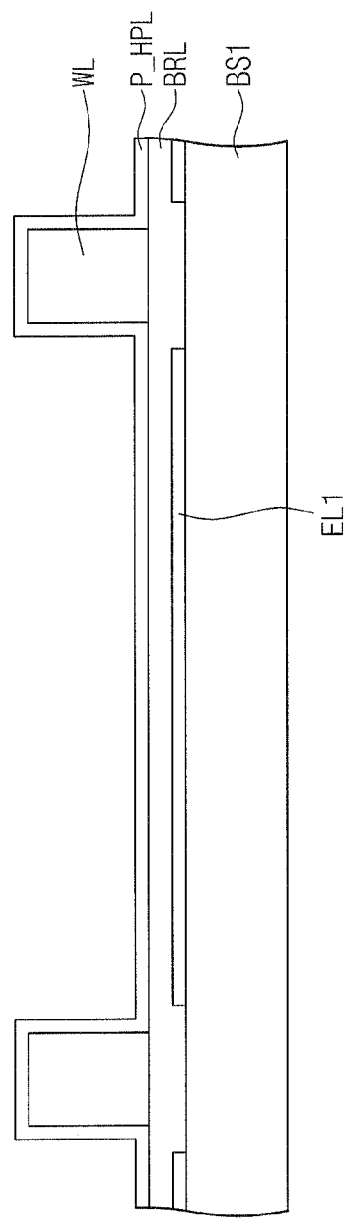
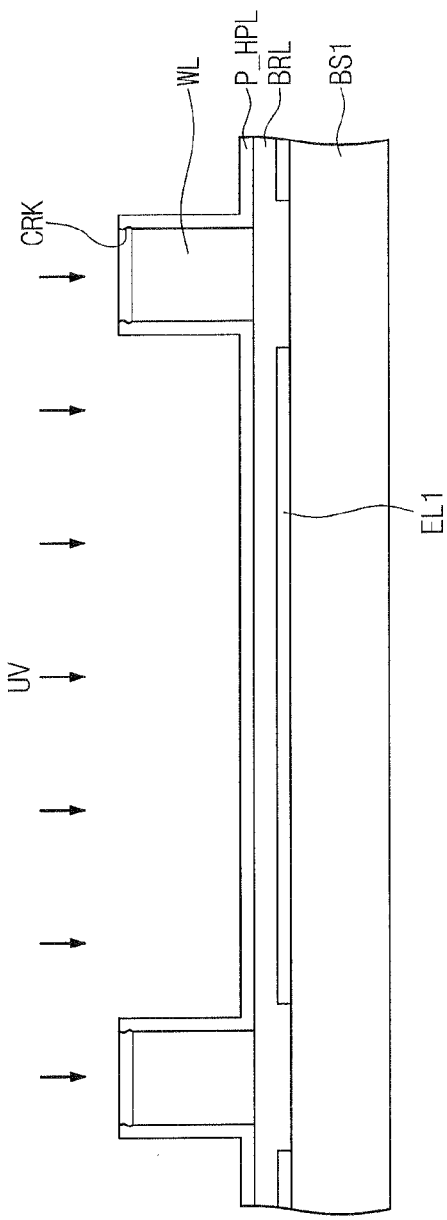

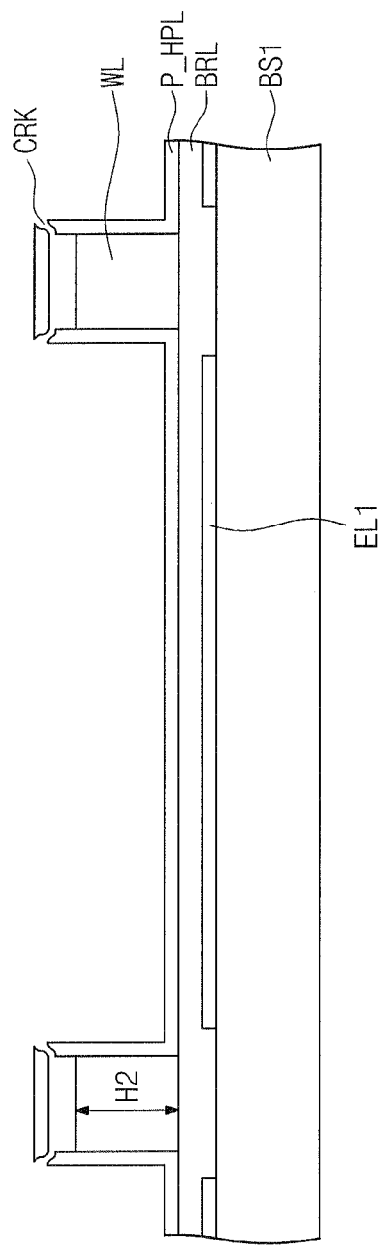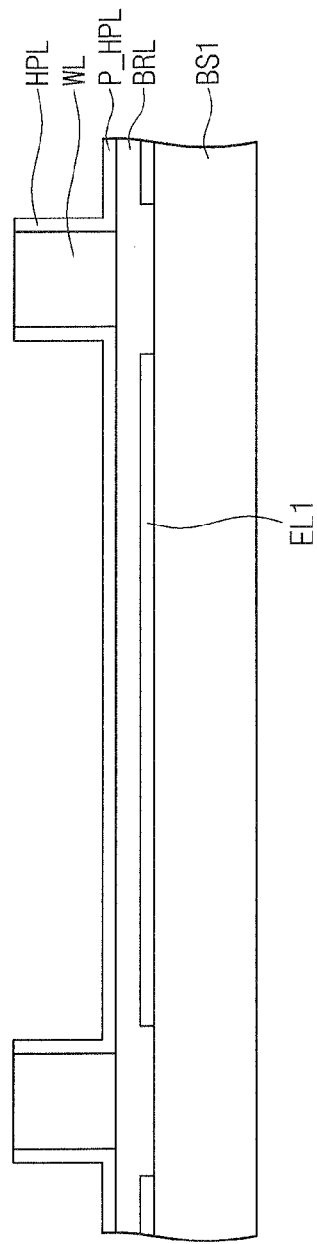

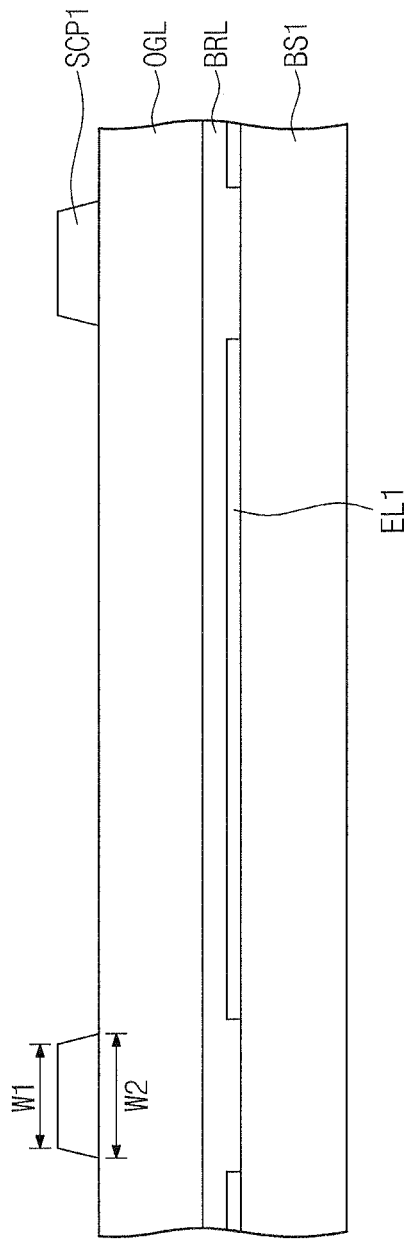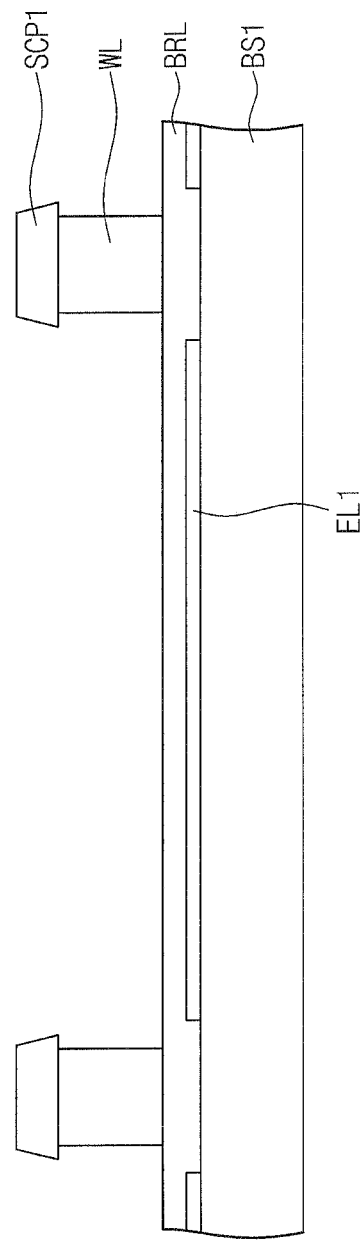

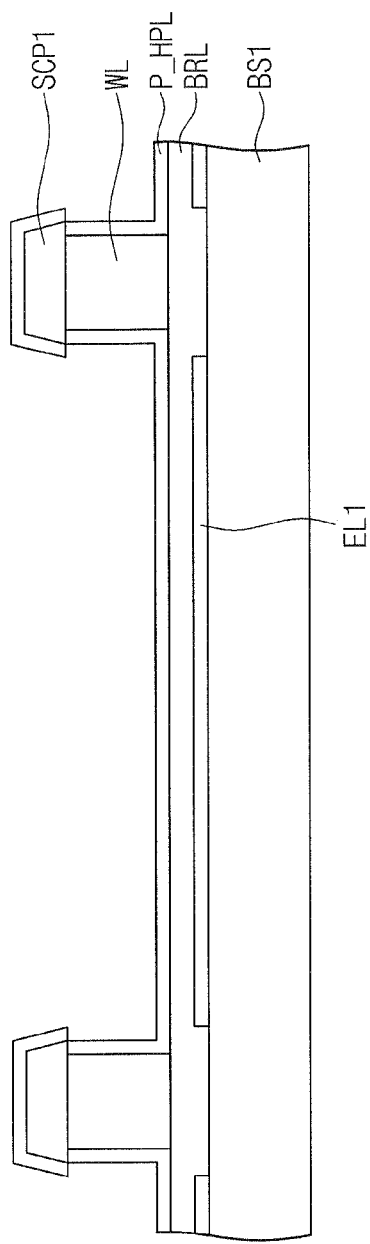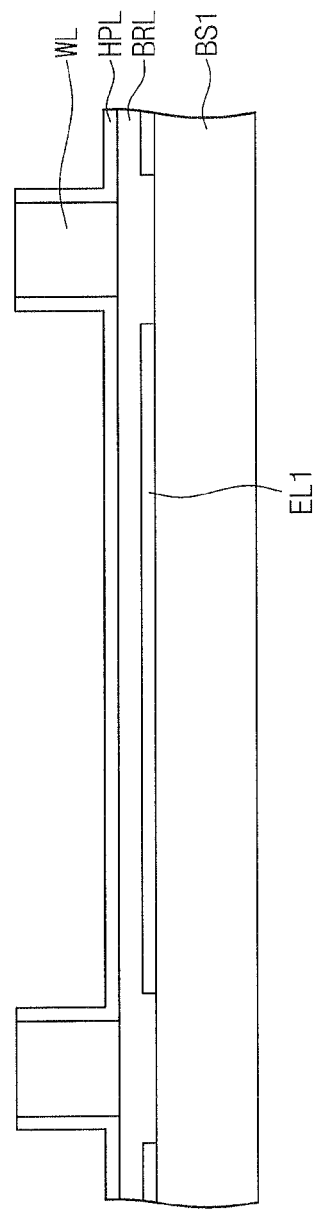

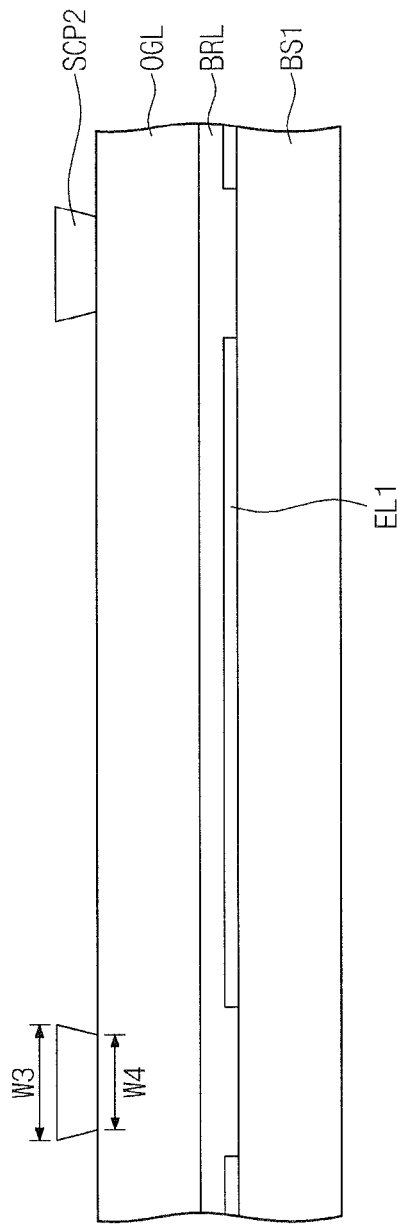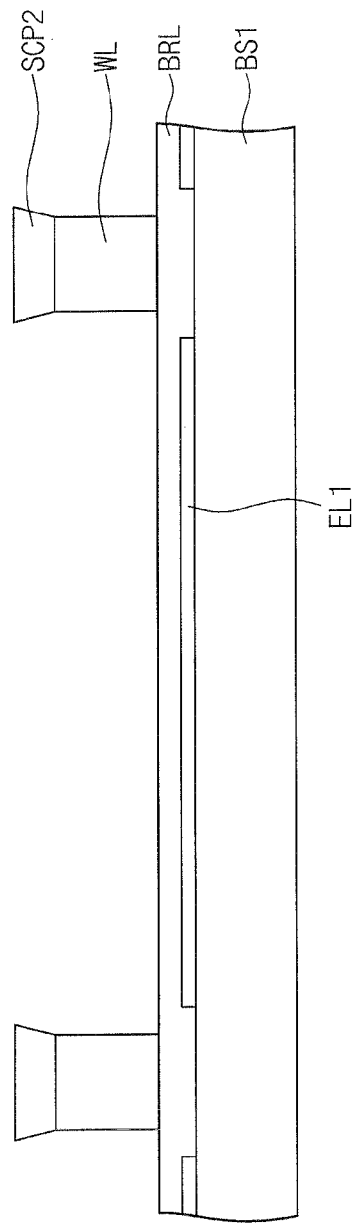

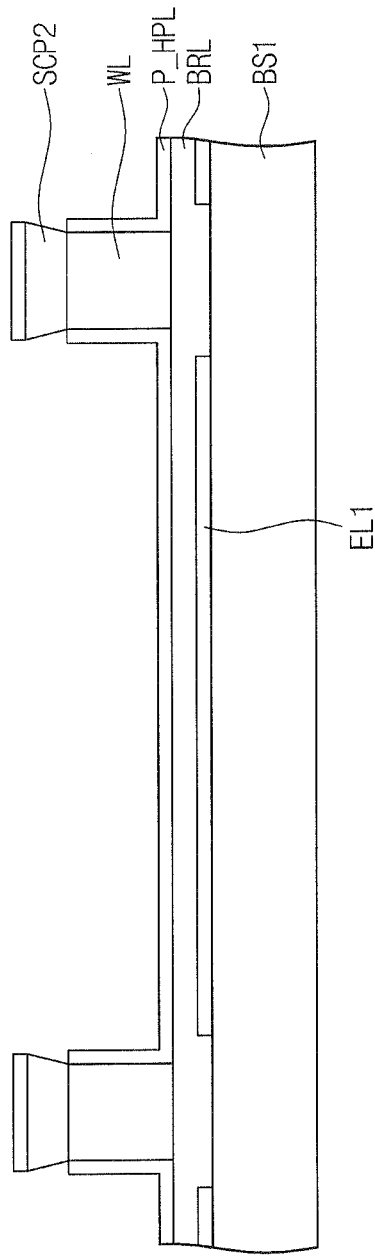
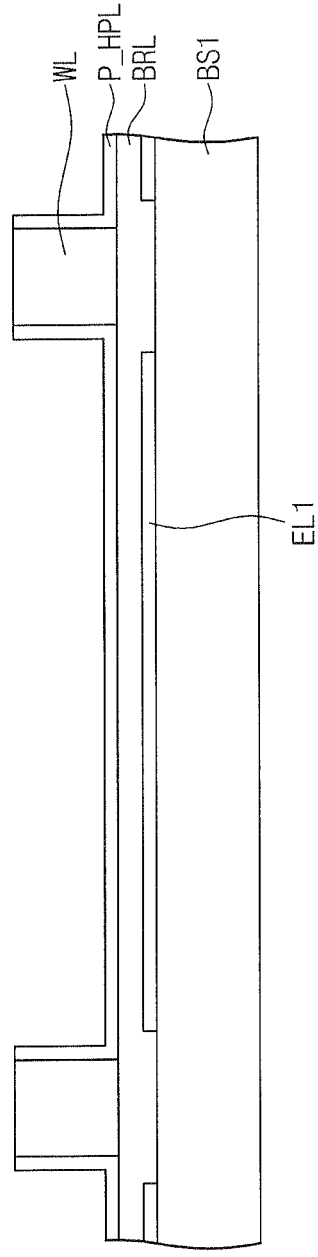

ELECTROWETTING DISPLAY DEVICE AND METHOD OF MANUFACTURING THE SAME

CROSS-REFERENCE TO RELATED APPLICATION

This U.S. non-provisional patent application claims priority under 35 U.S.C. §119 of Korean Patent Application No. 10-2012-0060573, filed on Jun. 5, 2012, the contents of which are hereby incorporated by reference.

TECHNICAL FIELD

The disclosure relates to an electrowetting display device using an electrowetting effect and a method of manufacturing the electrowetting display device.

DISCUSSION OF THE RELATED ART

Various flat panel displays, such as liquid crystal displays (LCDs), plasma display panel (PDP) displays, organic light emitting displays (OLEDs), field effect displays (FEDs), electrophoresis displays (EPDs), or electrowetting displays (EWDs), are widely used.

The electrowetting displays provide a voltage to an aqueous liquid electrolyte to change a surface tension of the aqueous liquid electrolyte and to reflect or transmit light from an exterior light source, thereby displaying images.

SUMMARY

Embodiments of the disclosure provide an electrowetting display device having increased display quality and a method of manufacturing the electrowetting display device having a simplified manufacturing process and reduced manufacturing time and costs, and increased display quality.

An exemplary embodiments of the inventive concept provides an electrowetting display device comprising a base substrate, an electrowetting layer which includes a first fluid and a second fluid immiscible with the first fluid in a pixel area, a wall on the base substrate to partition the pixel area and to restrict a flow range of at least of the first and second fluids, a hydrophobic layer on the pixel area, and an electronic device configured to apply an electric field to the electrowetting layer to control the electrowetting layer. The second fluid has electrical conductivity or polarity. The wall comprises a top surface substantially parallel to the base substrate and a lateral surface connecting the base substrate with the top surface. The hydrophobic layer covers the base substrate and the lateral surface.

An exemplary embodiment of the inventive concept provides an electrowetting display device which is manufactured by forming a wall to define a pixel area on a base substrate, forming a hydrophobic layer which covers a top surface of the base substrate and a lateral surface of the wall and exposes a top surface of the wall, forming an electrowetting layer in the pixel area, and forming an electronic device configured to control the electrowetting layer.

The hydrophobic layer is formed by forming a pre-hydrophobic layer on the substrate where the wall is formed, shrinking the wall to separate a portion of the pre-hydrophobic layer from the wall, and removing the separated portion of the pre-hydrophobic layer to expose the top surface of the wall.

When forming the hydrophobic layer, a UV ray may be irradiated to the pre-hydrophobic layer to form a crack in the pre-hydrophobic layer prior to the shrinking the wall.

The wall may be formed by coating an organic material on the base substrate to form an organic layer, forming a sacrificial pattern on the organic layer, and patterning the organic layer using the sacrificial pattern as a mask. The sacrificial pattern may comprise a negative type photoresist, a positive type photoresist or a metal. When the sacrificial pattern comprises the negative type photoresist or the metal, the sacrificial pattern may include a top surface having a greater width than that of the wall and a bottom surface having a same width as that of the wall in a cross sectional view. When the sacrificial pattern comprises the positive type photoresist, the sacrificial pattern may include a bottom surface having a greater width than that of the wall and a top surface having a smaller width than the bottom surface thereof in a cross sectional view. The hydrophobic layer may be formed by forming the pre-hydrophobic layer on the base substrate where the sacrificial pattern is formed and lifting off the sacrificial pattern and the pre-hydrophobic layer on the sacrificial pattern to expose the top surface of the wall.

According to an embodiment, there is provided a method of manufacturing an electrowetting display, the method including forming a wall on a surface of a base substrate, forming a hydrophobic layer on the wall and the surface of the base substrate, and removing the hydrophobic layer from a top surface of the wall.

Removing the hydrophobic layer from the top surface of the wall may include irradiating the wall with an ultra violet (UV) ray of a predetermined wavelength, shrinking the wall, and washing the hydrophobic layer out of the top surface of the wall.

Forming the wall on the surface of the base substrate may include sequentially forming an organic layer and a sacrificial layer on the surface of the base substrate and patterning the organic layer and the sacrificial layer to forming the wall and a sacrificial pattern.

Patterning the organic layer and the sacrificial layer may include etching the organic layer and the sacrificial layer at the same time.

Forming the wall on the surface of the base substrate may include sequentially forming an organic layer and a sacrificial layer on the surface of the base substrate and sequentially performing photolithography and etching on the sacrificial layer and the organic layer, respectively.

Removing the hydrophobic layer from the top surface of the wall may include lifting off the sacrificial pattern and the hydrophobic layer from the top surface of the wall.

BRIEF DESCRIPTION OF THE DRAWINGS

The embodiments of the invention will become readily apparent by reference to the following detailed description when considered in conjunction with the accompanying drawings, wherein:

FIG. 5 is a flowchart showing a method of manufacturing the electrowetting display device shown in FIG. 1;

FIGS. 6A to 6G are cross-sectional views showing the method of manufacturing the electrowetting display device shown in FIG. 1;

FIGS. 9A to 9G are cross-sectional views showing the method of manufacturing the electrowetting display device shown in FIG. 8;

FIGS. 10A to 10G are cross-sectional views showing a method of manufacturing the electrowetting display device shown in FIG. 1.

DETAILED DESCRIPTION

It will be understood that when an element or layer is referred to as being "on", "connected to" or "coupled to" another element or layer, it can be directly on, connected or coupled to the other element or layer or intervening elements or layers may be present. As used herein, the term "and/or" includes any and all combinations of one or more of the associated listed items.

As used herein, the singular forms, "a", "an" and "the" are intended to include the plural forms as well, unless the context clearly indicates otherwise.

Hereinafter, the invention will be explained in detail with reference to the accompanying drawings, wherein the same reference numbers may be used to denote the same or substantially the same elements throughout the drawings and the specification.

Figure 1:
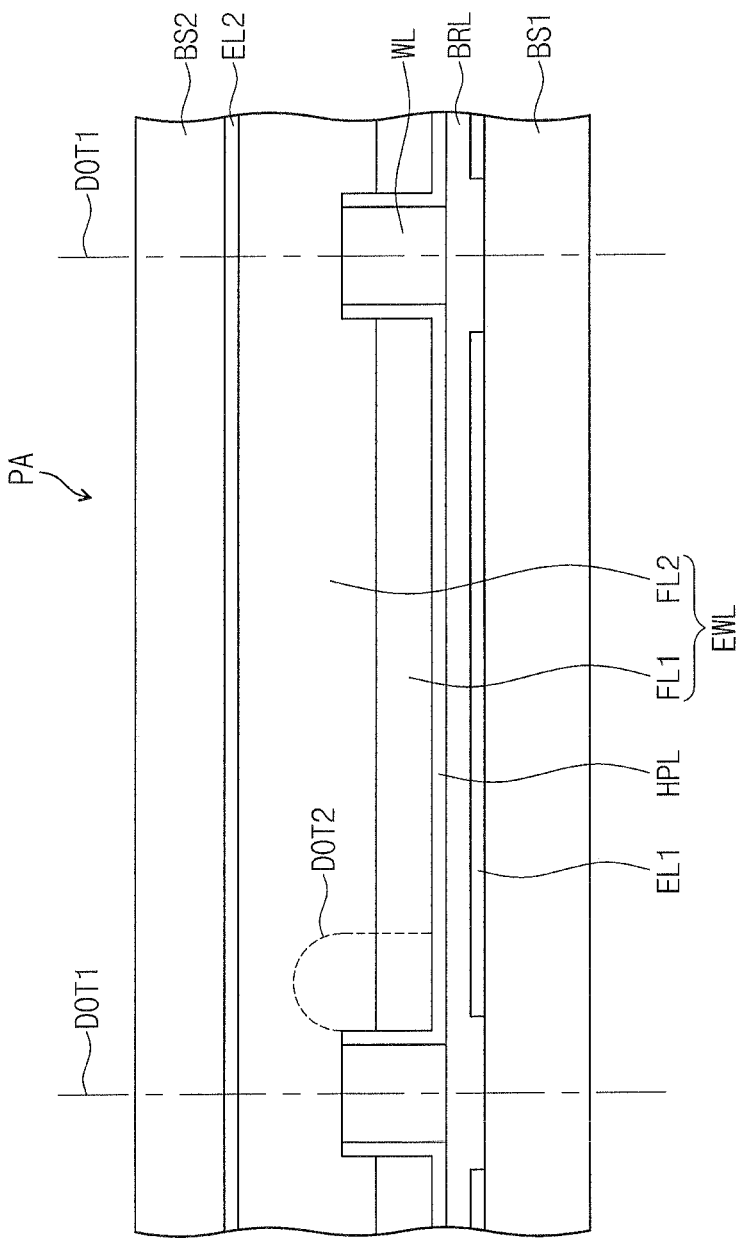
FIG. 1 is a cross-sectional view showing a portion of an electrowetting display device according to an embodiment of the invention.

FIG. 1 is a cross-sectional view showing a portion of an electrowetting display device according to an embodiment of the invention. The electrowetting display device includes a plurality of pixels arranged in a matrix shape and one of the pixels is shown in FIG. 1. As shown in FIG. 1, a range of the pixel is represented by two first dotted lines DOT1.

Referring to FIG. 1, each pixel includes an array substrate, an opposite substrate, and an electrowetting layer EWL. The array substrate includes a first base substrate BS1, a first electrode EL1, a switching device, a wall WL, and a hydrophobic layer HPL. The opposite substrate includes a second base substrate BS2 and a second electrode EL2. The first electrode EL1, the switching device, and the second electrode EL2 constitute an electronic device which controls the electrowetting layer EWL.

The electrowetting display device includes a front surface on which an image is displayed and a rear surface opposite to the front surface. A viewer in front of the front surface may perceive the image displayed on the electrowetting display device. In an exemplary embodiment, an outer surface of the second base substrate BS2 (e.g., a top surface of the second base substrate BS2 in FIG. 1) is referred to as the front surface or the top surface of the electrowetting display device, and an outer surface of the first base substrate BS1 (e.g., a bottom surface of the first base substrate BS1 in FIG. 1) is referred to as the rear surface or the bottom surface of the electrowetting display device. However, the positions of the front surface and the rear surface should not be limited thereto or thereby. The positions of the front and rear surfaces may be changed depending on an operation mode, such as a reflective mode, a transmissive mode, or a transflective mode of the electrowetting display device. According to an embodiment, the electrowetting display device employs a segmented display type which forms an image per segment including a plurality of pixels.

According to an embodiment, each of the first base substrate BS1 and the second base substrate BS2 is formed in a single body that is commonly shared by the pixels or is formed in a plurality of divisible members that are each used as at least a portion of each pixel. According to an embodiment, the first base substrate BS1 and/or the second base substrate BS2 includes, but are not limited to, a transparent insulator, such as glass or a polymer, e.g., plastic. For example, according to an embodiment, the first base substrate BS1 and/or the second base substrate BS2 is formed of polyethylene terephthalate (PET), fiber reinforced plastic (FRP), or polyethylene naphthalate (PEN). According to an embodiment, the first base substrate BS1 and/or the second base substrate BS2 is rigid or flexible.

The electrowetting layer EWL is provided in a space defined by the first base substrate BS1, the second base substrate BS2, and the wall. The electrowetting layer EWL includes a first fluid FL1 and a second fluid FL2. The first and second fluids FL1 and FL2 are immiscible with each other.

The first fluid FL1 has non-electrical conductivity. According to an embodiment, the first fluid FL1 includes alkane, such as hexadecane, or oil, such as silicone oil.

The second fluid FL2 has electrical conductivity or polarity and includes a mixture of water and ethyl alcohol in which potassium chloride is dissolved, or sodium chloride aqueous solution. According to an embodiment, the second fluid FL2 is transparent or has a color. As an example, the second fluid FL2 is white and absorbs or reflects light from an exterior source.

Hereinafter, for purposes of description, the first fluid FL1 is a non-conductive oil, and the second fluid FL2 is a conductive electrolyte. However, the material of the first fluid FL1 or the second fluid FL2 is not limited thereto.

The first fluid FL1 may absorb at least some optical spectra of light and transmit some other optical spectra of light, resulting in representing a color. The first fluid FL1 includes pigment particles or dyes to represent the color. Alternatively, the first fluid FL1 is black, so that the first fluid FL1 may absorb visible light of substantially all the optical spectra. According to an embodiment, the second fluid FL2 reflects the optical spectra of light.

The wall WL defines pixel areas PA by partitioning the pixel areas PA that respectively correspond to the pixels. A range of the pixel area PA is shown by the first dotted lines DOT1 shown in FIG. 1. The wall WL is provided on the first base substrate BS1. The wall WL protrudes from the first base substrate BS1. The wall WL includes a top surface parallel or substantially parallel to the first base substrate BS1 and a lateral surface connecting the top surface of the wall WL to the first base substrate BS1. According to an embodiment, when another layer is formed on the first base substrate BS1, the lateral surface connects the top surface of the wall WL to the other layer. The wall WL, together with the first base substrate BS1, defines a pixel space for each pixel area PA.

The hydrophobic layer HPL is disposed on the first base substrate BS1 and some surfaces of the wall WL in the pixel area PA. The hydrophobic layer HPL substantially covers the pixel area PA except a top surface of the wall WL corresponding to each pixel. For example, the hydrophobic layer HPL is disposed on the top surface of the first base substrate BS1 and the lateral surface of the wall WL. The hydrophobic layer HPL is not disposed on the top surface of the wall WL and exposes the top surface of the wall WL. Therefore, the hydrophobic layer HPL of each pixel is separated from the hydrophobic layer HPL of an adjacent pixel by the top surface of the wall WL where the hydrophobic layer HPL is not formed. According to an embodiment, the hydrophobic layer HPL covers at least a portion of the lateral surface of the wall WL.

According to an embodiment, a barrier layer BRL is disposed between the first base substrate BS1 and the hydrophobic layer HPL and between the first base substrate BS1 and the wall WL. According to an embodiment, the barrier layer BRL has a multi-layered structure, e.g., a double-layered structure. Alternatively, the barrier layer BRL is omitted.

The hydrophobic layer HPL includes a material having hydrophobic properties, e.g., a compound containing fluorine. According to an embodiment, the compound includes a polymer compound represented by a chemical formula, such as —CxFy-, CxFyHz-, —CxFyCzHp-, —CxFyO—, or —CxFyN(H)—, where each of x, y, x, p, n, and m is an integer equal to or larger than 1, or an amorphous fluorine compound, e.g., AF1600 by DuPont having the following chemical formula 1:

[chemical formula 1]

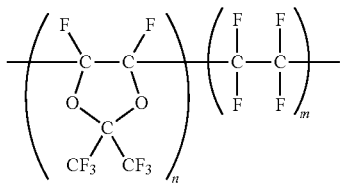

According to an embodiment, the hydrophobic layer HPL has a light transmissive property or a light reflective property. When the hydrophobic layer HPL has the light reflective property, light from an exterior source may be reflected by the hydrophobic layer HPL. According to an embodiment, the hydrophobic layer HPL is white, or alternatively, the hydrophobic layer HPL absorbs light of a specific wavelength and reflects light of another specific wavelength to represent a color other than white.

The wall WL, together with the hydrophobic layer HPL, restricts a moving range of at least one of the first and second fluids FL1 and FL2 to an inside of the pixel space. In an exemplary embodiment, a whole surface or part of the surface of the wall WL has a hydrophilic property such that the wall WL may allow the first fluid FL1 to be placed in the pixel space. The exposed top surface of the wall WL where the hydrophobic layer HPL is not formed has the hydrophilic property. When the top surface of the wall WL has a hydrophobic property, the first fluid FL1 may pass over the wall WL along the top surface thereof, thereby resulting in a malfunction of the electrowetting display device. The wall WL is formed of a hydrophilic organic compound so that a whole surface of the wall WL has the hydrophilic property.

Even when the wall WL has a hydrophilic surface, the first fluid FL1 may flow over the wall WL and reaches an adjacent pixel area PA. According to an embodiment, the wall WL has a height enough to prevent the first fluid FL1 from flowing over the wall WL to an adjacent pixel area PA. According to an embodiment, the height of the wall WL may be equal to or less than a maximum height of the first fluid FL1.

The electronic device is provided in each pixel and controls the electrowetting layer EWL by applying electric potential to the electrowetting layer EWL. The first electrode EL1 is disposed on the first base substrate BS1. The switching device is disposed on the first base substrate BS1 and connected with the first electrode EL1. The second electrode EL2 is disposed on the second base electrode BS2.

The first electrode EL1 is disposed between the first base substrate BS1 and the hydrophobic layer HPL. According to an embodiment, a barrier layer BRL is provided between the first electrode EL1 and the hydrophobic layer HPL. The barrier layer BRL prevents the second fluid FL2 from directly contacting the first electrode EL1.

The first electrode EL1 is separated from the electrowetting layer EWL by the hydrophobic layer HPL. According to an embodiment, the first electrode EL1 has a predetermined shape. The first electrode EL1 is applied with a voltage signal by the switching device. The switching device is provided in each pixel, resulting in an array of switching devices on the first base substrate BS1.

According to an embodiment, the second electrode EL2 is formed as a single electrode to cover all the pixels. Alternatively, the second electrode EL2 is divided into a plurality of sub-electrodes which respectively correspond to the pixels. When the second electrode EL2 is divided into the plurality of sub-electrodes, the divided sub-electrodes are electrically connected to each other. According to an embodiment, the second electrode EL2 directly contacts the second fluid FL2.

In an exemplary embodiment, the first electrode EL1 and the second electrode EL2 are respectively disposed on the first base substrate BS1 and the second base substrate BS2, but they should not be limited thereto or thereby. For instance, alternatively, the first and second electrodes EL1 and EL2 may be disposed on the first base substrate BS1. According to an embodiment, the second electrode EL2 may be provided at at least one side portion of the first electrode EL1 and electrically insulated from the first electrode EL1. For example, according to an embodiment, the first electrode EL1 is disposed on a portion of the pixel area PA surrounded by the wall WL, and the second electrode EL2 is disposed on a remaining portion of the pixel area PA and spaced apart from the first electrode EL1. Alternatively, the first electrode EL1 may be provided in the pixel area PA surrounded by the wall WL and the second electrode EL2 may be provided in an area where the wall WL is formed, such as a bottom surface or a lateral surface of the wall WL, to be spaced apart from the first electrode EL1.

When two voltages having different levels from each other are applied to the first electrode EL1 and the second electrode EL2, respectively, the pixel is turned on. An electrostatic force, e.g., a repulsive force or an attractive force caused by a voltage difference between the two voltages moves the second fluid FL2 to the first electrode EL1, and thus the first fluid FL1 is pushed out from at least a portion of the hydrophobic layer HPL to the wall WL. The pushed first fluid FL1 may have a drop shape as shown by second dotted lines DOT2. The first fluid FL1 has the maximum height when the pixel is turned on. The hydrophobic layer HPL of the pixel is exposed when the first fluid FL1 is pushed to the wall WL.

When the voltage difference between the first electrode EL1 and the second electrode EL2 of the pixel is about zero volts or is close to zero volts, the pixel turns off, the electrostatic force caused by the voltage difference disappears, and the first fluid FL1 covers the hydrophobic layer HPL again. As such, the first fluid FL1 functions as an optical switch that may be electrically controlled in each pixel.

Figure 2:
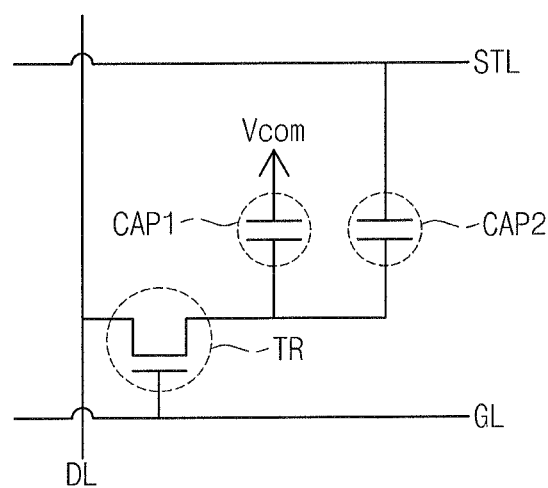
FIG. 2 is equivalent circuit diagram showing a pixel included in the electrowetting display device shown in FIG. 1.

FIG. 2 is an equivalent circuit diagram showing a pixel of the electrowetting display device shown in FIG. 1.

The pixel includes a switching device TR, a first capacitor CAP1 and a second capacitor CAP2. In FIG. 2, the pixel includes one switching device. However, the embodiments of the present invention are not limited thereto. Alternatively, each pixel of the electrowetting display may include more than one switching device.

The switching device TR includes a gate electrode, a source electrode, and a drain electrode. The switching device TR is connected with a wiring part. The wiring part includes a gate line GL and a data line DL, which are connected to the switching device TR, and a storage line STL. The gate electrode is connected to the gate line GL, the source electrode is connected to the data line DL, and the drain electrode is connected to the first and second capacitors CAP1 and CAP2. The first capacitor CAP1, which is also referred to as an electrowetting capacitor, includes a first electrode EL1, a second electrode EL2, and a fluid provided between the first electrode EL1 and the second electrode EL2. The second electrode EL2 contacts the second fluid FL2 to receive a common voltage Vcom applied to a second fluid FL2. The second capacitor CAP2, which is also referred to as a storage capacitor, includes the drain electrode (and/or first electrode EL1), a storage electrode, and an insulating layer disposed between the drain electrode and the storage electrode. The storage electrode is connected to the storage line STL.

When the gate line GL is applied with a gate signal, the switching device TR is turned on, and thus a voltage applied to the data line DL is applied to the first and second capacitors CAP1 and CAP2 through the turned-on switching device TR. A data voltage applied to the first electrode EL1 remains charged in the first and second capacitors CAP1 and CAP2 by a coupling capacitance of the first and second capacitors CAP 1 and CAP2 and a leakage current, thereby driving the pixel until the data voltage is refreshed.

Figure 3:
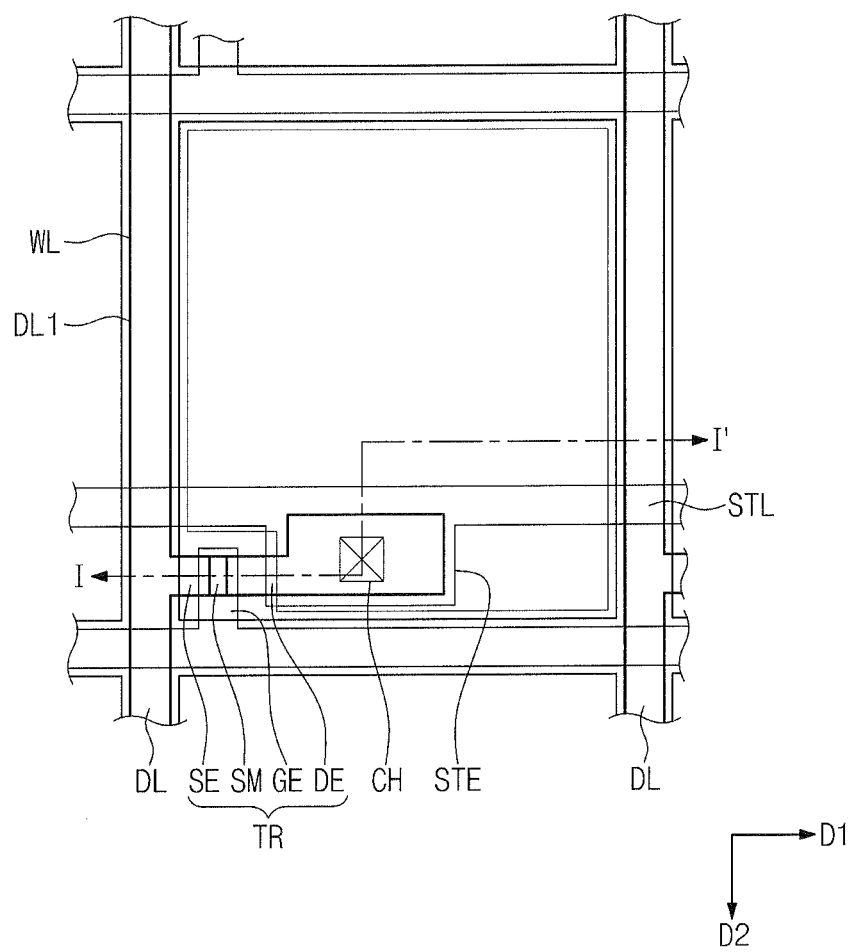
FIG. 3 is a plan view showing the electrowetting display device shown in FIG. 1.
Figure 4:
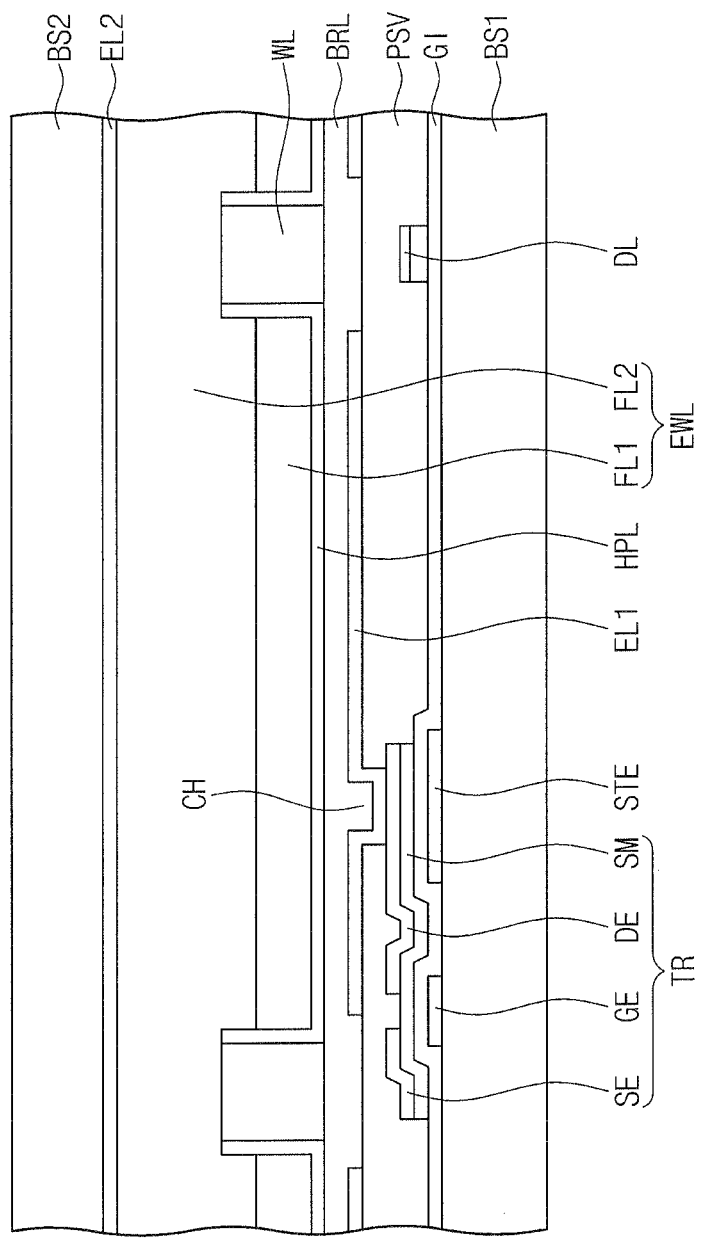
FIG. 4 is a cross-sectional view taken along a line I-I' shown in FIG. 3.

FIG. 3 is a plan view showing the electrowetting display device shown in FIG. 1. FIG. 4 is a cross-sectional view taken along a line I-I' shown in FIG. 3. The electrowetting display device includes a plurality of pixels arranged in a matrix shape, and one of the pixels has been shown in FIG. 3 and FIG. 4.

Referring to FIGS. 3 and 4, the electrowetting display device includes an array substrate, an opposite substrate facing the array substrate, and an electrowetting layer EWL disposed between the array substrate and the opposite substrate.

The array substrate includes a first base substrate BS1, a wiring part, a first electrode EL1, a switching device TR, a wall WL, and a hydrophobic layer HPL.

According to an embodiment, the first base substrate BS1 has a rectangular shape having two long sides and two short sides.

The wiring part transfers signals to the switching device TR and includes a plurality of gate lines GL, a plurality of data lines DL, a plurality of storage electrodes STE, and a plurality of storage lines STL.

The gate lines GL are disposed on the first base substrate BS1 and extend in a row direction D1. The storage electrodes STE are spaced apart from the gate lines GL. The storage lines STL extend in the row direction D1 and are substantially parallel to the gate lines GL. The storage lines STL are connected with the storage electrodes STE. The data lines DL extend in a column direction D2 crossing the row direction D1. The data lines DL are disposed on the first base substrate BS1, and a gate insulator GI is disposed between the data lines DL and the first base substrate BS1. According to an embodiment, the gate insulator GI includes a silicon oxide or a silicon nitride.

The switching device TR is connected with a corresponding one of the gate lines GL and a corresponding one of the data lines DL. The switching device TR includes a gate electrode GE, a semiconductor layer SM, a source electrode SE, and a drain electrode DE.

The gate electrode GE protrudes from the gate line GL. The gate electrode GE includes a conductive material, such as a metal, for example, copper (Cu), molybdenum (Mo), aluminum (Al), tungsten (W), chromium (Cr), titanium (Ti), or an alloy including at least one thereof.

The gate insulator GI is disposed over the first base substrate BS1 and covers the gate line GL and the gate electrode GE.

The semiconductor layer SM is disposed on the gate electrode GE, and the gate insulator GI is disposed between the semiconductor layer SM and the gate electrode GE. According to an embodiment, the semiconductor layer SM includes an oxide semiconductor, an amorphous silicon semiconductor, or a crystalline or polycrystalline silicon semiconductor.

The semiconductor layer SM includes an active layer disposed on the gate insulator GI and an ohmic contact layer disposed on the active layer. When viewed in a plan view, the active layer is disposed in an area in which the source electrode SE and the drain electrode DE are formed and in an area between the source electrode SE and the drain electrode DE. The ohmic contact layer is disposed between the active layer and the source electrode SE and between the active layer and the drain electrode DE.

The source electrode SE is branched from the data line DL, and the drain electrode DE is spaced apart from the source electrode SE. Portions of the source and drain electrodes SE and DE overlap the gate electrode GE when viewed in a plan view.

The source electrode SE and the drain electrode DE include a conductive material, such as copper, molybdenum, aluminum, tungsten, chromium, titanium, or an alloy including at least one thereof.

In an exemplary embodiment, the source electrode SE and the drain electrode DE overlap a portion of the semiconductor layer SM in an area except an area between the source electrode SE and the drain electrode DE. A portion of the semiconductor layer SM corresponding to the area between the source electrode SE and the drain electrode DE functions as a channel portion. When the switching device TR is turned on, a current flows between the source electrode SE and the drain electrode DE through the channel portion.

A passivation layer PSV is disposed on the channel portion to cover and protect the channel portion. According to an embodiment, the passivation layer PSV includes silicon nitride or silicon oxide.

The first electrode EL1 is connected to the drain electrode DE through a contact hole CH formed through the passivation layer PSV. A portion of the drain electrode DE is exposed through the contact hole CH, and the first electrode EL1 is connected to the exposed portion of the drain electrode DE through the contact hole CH.

In an exemplary embodiment, when the electrowetting display device has a transmission type structure, the first electrode EL1 includes a transparent conductive material, such as indium tin oxide (ITO), indium zinc oxide (IZO), or indium tin zinc oxide (ITZO). In an alternative exemplary embodiment, when the electrowetting display device has a reflection type structure, the first electrode EL1 includes a conductive material having a light reflective property, such as a metal, e.g., aluminum. According to an embodiment, the first electrode EL1 has a multi-layered structure including the transparent conductive material and the conductive material having the light reflective property. Further, when the electrowetting display device has a transflective type structure, the first electrode EL1 includes a reflective portion to reflect external light and a transmissive portion to transmit the external light. According to an embodiment, the first electrode EL1 has a single-layered structure or a multi-layered structure of a transparent conductive material and/or a conductive material that reflects light.

According to an embodiment, a color filter is disposed between the drain electrode DE and the passivation layer PSV. The color filter allows light that passes through each pixel PX to represent a color. According to an embodiment, the color filter includes a red color filter, a green color filter, and a blue color filter that respectively correspond to some pixels. A pixel provided with the red color filter is referred to as a red color pixel, a pixel provided with the green color filter as a green color pixel, and a pixel provided with the blue color filter as a blue color pixel. Alternatively, the color filter further includes a color different from the colors, such as red, green, and blue.

A barrier layer BRL is disposed on the first base substrate BS1 where the first electrode EL1 is formed. The barrier layer BRL prevents some of materials constituting of the electrowetting layer EWL, for example, polar or conductive materials, from penetrating or diffusing into the first electrode EL1. When the polar or conductive materials reach the first electrode EL1, the first electrode EL1 and the electrowetting layer EWL may be electrically conducted to each other through the materials with polarity or conductivity.

The wall WL is disposed on the first base substrate BS1 on which the barrier layer BRL is formed. The wall WL protrudes from the first base substrate BS1 and forms a pixel space in each pixel area PA. The pixel space is surrounded by the first base substrate BS1 and the wall WL. The wall WL restricts a movement range of at least one of the first fluid FL1 and the second fluid FL2.

The hydrophobic layer HPL covers a top surface of the first base substrate BS1 and a lateral surface of the wall WL. A top surface of the wall WL exposed by the hydrophobic layer HPL has a hydrophilic property. Thus, the first fluid FL1 is repelled from the top surface of the wall WL, so that the movement of the first fluid FL1 is restricted in the pixel space and does not flow over the wall WL.

The opposite substrate includes a second base substrate BS2 facing the first base substrate BS1 and a second electrode EL2 disposed on the second base substrate BS2.

The second electrode EL2 is formed as a single electrode to cover all the pixels. Alternatively, the second electrode EL2 may be divided into a plurality of sub-electrodes which respectively correspond to the pixels. When the second electrode EL2 is divided into the plurality of sub-electrodes, the divided sub-electrodes are electrically connected to each other. The second electrode EL2 directly contacts the second fluid FL2.

The second electrode EL2 includes a transparent conductive material, such as indium tin oxide, indium zinc oxide, or indium tin zinc oxide.

FIG. 5 is a flowchart showing a method of manufacturing the electrowetting display device shown in FIG. 1. FIGS. 6A to 6G are cross-sectional views showing a method of manufacturing the electrowetting display device shown in FIG. 1.

Referring to FIG. 5, the electrowetting display device is manufactured by forming an array substrate and an opposite substrate and by coupling the array substrate with the opposite substrate.

Forming the array substrate includes forming a first electrode on the first base substrate (S111), forming a wall to define a pixel space (S121), forming a pre-hydrophobic layer in the pixel space (S131), shrinking the wall to separate a portion of the pre-hydrophobic layer from the wall (S141), removing the separated pre-hydrophobic layer to form a hydrophobic layer (S151), and forming an electrowetting layer (S161). Forming the opposite substrate includes forming a second electrode on a second base substrate (S171). The array substrate and the opposite substrate are coupled to face each other, with the electrowetting layer disposed between the array substrate and the opposite substrate (S181).

The method of manufacturing the electrowetting display device is described in greater detail with reference to FIGS. 1, 3, 4, 5 and 6A to 6G.

Referring to 6A, a first base substrate BS1 is prepared, and a switching device and a first electrode EL1 are formed on the first base substrate BS1.

A gate line pattern is formed of a first conductive material on the first base substrate BS1 of a transparent insulating material. The gate line pattern includes a gate electrode GE, a gate line GL, a storage electrode STE, and a storage line STL.

The gate line pattern is formed by forming a first conductive material, such as a metal, on the first base substrate BS1 and patterning the first conductive material through a photolithography process using a first mask. According to an embodiment, the first conductive material includes a metal, such as, for example, copper (Cu), molybdenum (Mo), aluminum (Al), tungsten (W), chromium (Cr), titanium (Ti), or an alloy including at least one thereof. According to an embodiment, the gate line pattern is formed in a single-layered or multi-layered structure. According to an embodiment, the gate line pattern includes an alloy layer using a metal. For example, according to an embodiment, the gate line pattern includes a triple metal layer which includes molybdenum, aluminum, and molybdenum sequentially stacked, or includes a molybdenum-aluminum alloy layer.

Then, a gate insulator GI is formed on the gate line pattern. A semiconductor layer SM is formed on the gate insulator GI. According to an embodiment, the semiconductor layer SM includes doped or undoped silicon or an oxide semiconductor. The semiconductor layer SM is provided over the gate electrode GE and overlaps at least a portion of the gate electrode GE in a plan view.

A data line pattern is formed on the semiconductor layer SM. The data line pattern includes a data line DL, a source electrode SE, and a drain electrode DE.

According to an embodiment, the semiconductor layer SM and the data line pattern are formed through a single photolithography process using a second mask. According to an embodiment, the second mask includes a slit mask or half tone mask or a diffraction mask. According to an embodiment, the photolithography process using the slit mask is described below.

The gate insulator GI, a semiconductor thin film, and a second conductive layer are sequentially stacked on the first base substrate BS1 on which the gate line pattern is formed. The second conductive layer is formed of a second conductive material, such as copper (Cu), molybdenum (Mo), aluminum (Al), tungsten (W), chromium (Cr), titanium (Ti), or an alloy including at least one thereof. According to an embodiment, the second conductive layer includes a single-layered or multi-layered structure. According to an embodiment, the second conductive layer includes an alloy layer formed of the second conductive material.

Next, a photoresist is formed on the first base substrate BS1 and then the photoresist is exposed through the second mask to light, such as an ultra-violet ray. The second mask includes a first region that blocks the irradiated light, a second region in which a slit pattern is formed to partially transmit and partially block the irradiated light, and a third region that transmits the irradiated light. When the photoresist exposed through the second mask is developed, a photoresist pattern which has a predetermined thickness remains in the second and third regions where the irradiated light is fully or partially blocked by the second mask. The photoresist is substantially completely removed from the first region where light is transmitted so that the surface of the second conductive layer is externally exposed. Since the second region is more exposed to light than the first region, the photoresist pattern corresponding to the second region has a thickness less than a thickness of the photoresist pattern corresponding to the first region. Next, the semiconductor thin film and the second conductive layer are selectively patterned using the photoresist pattern as a mask. Accordingly, the semiconductor layer SM and the second conductive pattern of the second conductive material are formed on a predetermined area of the gate line GL. Then, when half-tone etching of the photoresist pattern is conducted through an ashing process or an etch-back process, the photoresist pattern on the semiconductor layer SM corresponding to the second region where the slit pattern is formed is completely removed, so that the surface of the second conductive pattern is partially exposed. The exposed second conductive pattern and an upper portion of the semiconductor layer SM corresponding to the exposed conductive pattern are removed using the remaining photoresist pattern as a mask, and the remaining photoresist pattern is removed. Accordingly, the semiconductor layer SM, the source electrode SE, the drain electrode DE, and the data line DL and the channel portion between the source electrode SE and the drain electrode DE are formed. In an exemplary embodiment, the photoresist of a positive type is used, but is not limited thereto. A negative-type photoresist may be used in an alternately exemplary embodiment.

The method of forming the semiconductor layer SM and the data line pattern is not limited to the above-described single photolithography process. Alternatively, the semiconductor layer SM and the data line pattern may be respectively formed through two photolithography processes different from each other.

A passivation layer PSV is formed on the first base substrate BS1 on which the data line pattern is formed. The passivation layer PSV is disposed on the first base substrate BS1 and covers the switching device. According to an embodiment, a color filter is formed on the passivation layer PSV. According to an embodiment, the color filter includes one of a red color filter, a green color filter, and a blue color filter. The red color filter, the green color filter, and the blue color filter are respectively formed by a single photolithography process including coating a photosensitive organic material with a color and by exposing and developing the photosensitive organic material using a mask. According to an embodiment, the photosensitive organic material contains a pigment or a dye of a specific color, such as red, green, or blue.

A contact hole CH is formed through a portion of the passivation layer PSV to expose the drain electrode DE of the switching device. According to an embodiment, the contact hole CH is formed by a photolithography process.

Next, the first electrode EL1 is formed on the first base substrate BS1. The first electrode EL1 is formed by forming a conductive layer with a conductive material and patterning the conductive layer using a photolithography process.

The first electrode EL1 includes a transparent conductive material, such as indium tin oxide (ITO), indium zinc oxide (IZO), or indium tin zinc oxide (ITZO). When the electrowetting display device has a reflection type structure, the first electrode EL1 includes a conductive material with a reflective property, such as a metal, e.g., aluminum. According to an embodiment, the first electrode EL1 has a multi-layered structure using a transparent conductive material and a reflective conductive material. When the electrowetting display device has a transflective type structure, the first electrode EL1 includes a reflective portion to reflect external light and a transmissive portion to transmit the external light. According to an embodiment, the first electrode EL1 has a single-layered structure or a multi-layered structure of a transparent conductive material and/or a reflective conductive material.

The first electrode EL1 is connected with the drain electrode DE through the contact hole CH.

Then, a barrier layer BRL is formed on the first base substrate BS1 on which the first electrode EL1 is formed. According to an embodiment, the barrier layer BRL is formed by a deposition scheme using a shadow mask or a photolithography process. According to an embodiment, the barrier layer BRL has a single-layered structure or a multi-layered structure.

Next, referring to 6B, a wall WL is formed on the first base substrate BS1 on which the barrier layer BRL is formed. The wall WL is formed by a photolithography process, e.g., which includes coating a photosensitive layer having a photosensitive organic polymer on the first base substrate BS1, and exposing and developing the photosensitive layer. According to an embodiment, the photosensitive organic polymer includes a hydrophilic material or a hydrophilic functional group to form the wall WL having a hydrophilic property.

The photosensitive layer is primarily baked at a first temperature. The photosensitive layer is protruded from the first base substrate BS1 during the exposure and the development process and is patterned to form the wall WL which includes a top surface parallel to a top surface of the first base substrate BS1 and a lateral surface which connects the top surface of the wall WL to the top surface of the first base substrate BS1 (or a top surface of another layer formed on the first base substrate BS1). During the primary baking process, the wall WL is pre-baked not to be completely cured and to have a first height H1. According to an embodiment, the first temperature is less than a curing temperature of the photosensitive layer and may change according to the type, properties, or curing duration of the photosensitive layer. For example, according to an embodiment, the first temperature is in a range of about 110° C. to about 140° C., e.g., about 130° C.

Referring to FIG. 6C, the pre-hydrophobic layer P_HPL is formed on the top surface of the first base substrate BS1 on which the wall WL is formed. The pre-hydrophobic layer P_HPL is formed on the top surface of the first base substrate BS1 so that the pre-hydrophobic layer P_HPL covers a portion of the top surface of the first base substrate BS1 and the top and lateral surfaces of the wall WL. According to an embodiment, the pre-hydrophobic layer P_HPL includes a compound containing fluorine so that the surface of the pre-hydrophobic layer P_HPL has a hydrophobic property. According to an embodiment, the pre-hydrophobic layer P_HPL may be formed by depositing or coating a hydrophobic material on the first base substrate BS1 but is not limited thereto or thereby. For example, according to an embodiment, the pre-hydrophobic layer P_HPL is formed by an ink-jet process.

Referring to FIG. 6D, ultra violet (UV) rays (UV) are irradiated to the pre-hydrophobic layer P_HPL. The UV rays have a band of wavelengths that may break bonds between molecules in the pre-hydrophobic layer P_HPL. When the pre-hydrophobic layer P_HPL includes an amorphous fluorine compound, the pre-hydrophobic layer P_HPL transmits most of the UV rays having a wavelength of about 200 nm or more and absorbs some of the UV rays having a wavelength under about 200 nm. The pre-hydrophobic layer P_HPL of the amorphous fluorine compound absorbs UV rays having a wavelength of about 170 nm or less, thereby breaking some of the bonds between molecules in the pre-hydrophobic layer P_HPL. Thus, UV rays having a wavelength under about 200 nm, e.g., of about 170 nm or less may be irradiated to the pre-hydrophobic layer P_HPL. Oxygen atoms and/or ozone may be generated as oxygen molecules and/or ozone is split by the UV, and the generated oxygen atoms may react with materials in the pre-hydrophobic layer P_HPL, thus resulting in volatile molecules. The volatile molecules may be removed from the pre-hydrophobic layer P_HPL to the air. Accordingly, cracks CRK may be formed in and on the pre-hydrophobic layer P_HPL, e.g., on the surface of the pre-hydrophobic layer P_HPL. According to an embodiment, the UV rays may have a wavelength enough to form as many cracks CRK on the surface of the pre-hydrophobic layer P_HPL as possible.

Figure 7A:
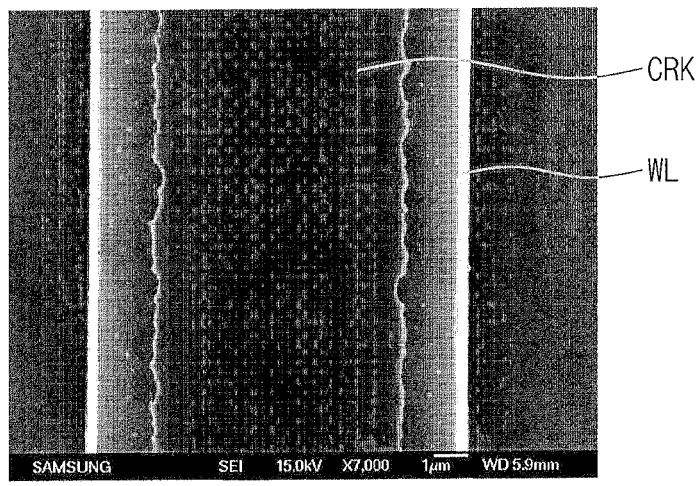
FIGS. 7A and 7B are scanning electron microscope (SEM) photographs showing the pre-hydrophobic layer after irradiating UV to the pre-hydrophobic layer.
Figure 7B:
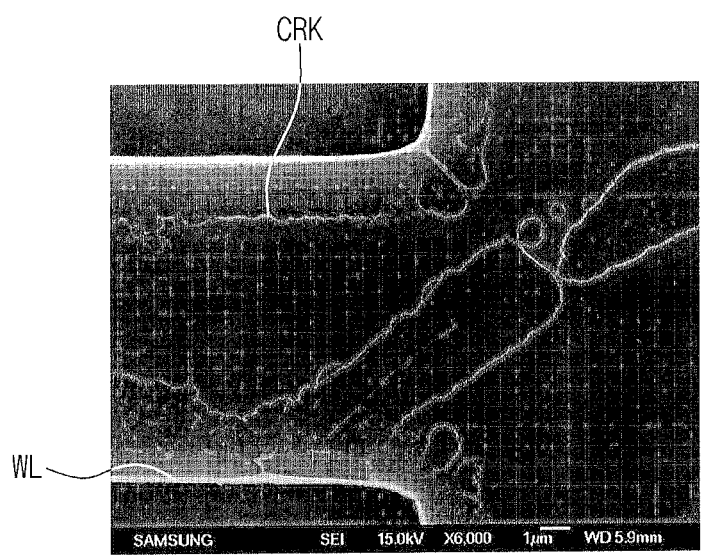

FIGS. 7A and 7B are scanning electron microscope (SEM) photographs showing the pre-hydrophobic layer after irradiating the UV rays to the pre-hydrophobic layer P_HPL. Referring to FIGS. 7A and 7B, cracks CRK are formed in and on the pre-hydrophobic layer P_HPL which covers the wall WL.

Next, referring to FIG. 6E, the wall WL is secondarily baked at a second temperature. The wall WL shrinks as the secondary baking proceeds. Therefore, a height of the wall WL decreases to a second height H2 smaller than the first height H1. The secondary baking process is performed at a temperature that is higher than a temperature adopted in the primary baking process so that the wall WL may be sufficiently cured but that is lower than a glass transition temperature (Tg) of the pre-hydrophobic layer P_HPL so that the pre-hydrophobic layer P_HPL is prevented from melting. For example, according to an embodiment, the second temperature is in a range of about 115° C. to about 160° C.

During the second baking process, the pre-hydrophobic layer P_HPL does not shrink or shrinks less than the wall WL. Therefore, a portion of the pre-hydrophobic layer P_HPL is separated from the top surface of the wall WL. Part of the pre-hydrophobic layer P_HPL may shrink or vanish, so that the cracks CRK may widen.

Then, referring to FIG. 6F, the part of the pre-hydrophobic layer P_HPL corresponding to the top surface of the wall WL is removed through a cleaning process, and a hydrophobic layer HPL which covers the top surface of the first base substrate BS1 and the lateral surface of the wall WL is formed. The part of the pre-hydrophobic layer P_HPL can be easily removed by the cracks widened when the secondary baking process. The hydrophobic layer HPL is not provided on the top surface of the wall WL and the top surface of the wall WL is exposed to the exterior. Accordingly, the top surface of the first base substrate BS1 and the lateral surface of the wall WL have a hydrophobic property, and the top surface of the wall WL has a hydrophilic property.

According to an embodiment, an additional UV ray may be irradiated to the top surface of the wall WL to remove debris of the pre-hydrophobic layer P_HPL which may be left on the top surface of the wall WL after the cleaning process. The UV ray has a wavelength of about 200 nm or less, e.g., about 170 nm or less. The additional UV ray provides energy to the debris so that the molecules of the debris react with each other or the debris reacts with other material, such as oxygen or ozone, resulting in removal of the debris.

Then, the wall WL is hard baked at a third temperature and is cured completely. According to an embodiment, the third temperature is about 200° C. or more.

Next, an electrowetting layer EWL is formed on the first base substrate BS1 on which the hydrophobic layer HPL and the wall WL are formed. The electrowetting layer EWL is formed by coating a first fluid FL1 and a second fluid FL2 on the first base substrate BS1. The first fluid FL1 and the second fluid FL2 can be coated in various ways, for example, by dipping the first base substrate BS1 into the first fluid FL1 and/or the second fluid FL2.

The second electrode EL2 is formed on a second base substrate BS2 opposite to the first base substrate BS1.

Figure 6A:
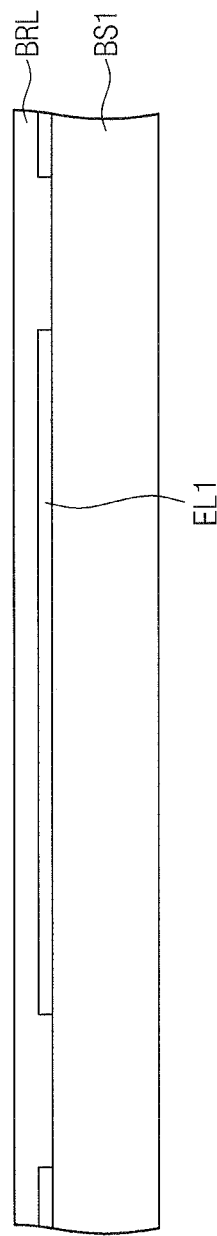
Figure 6B:
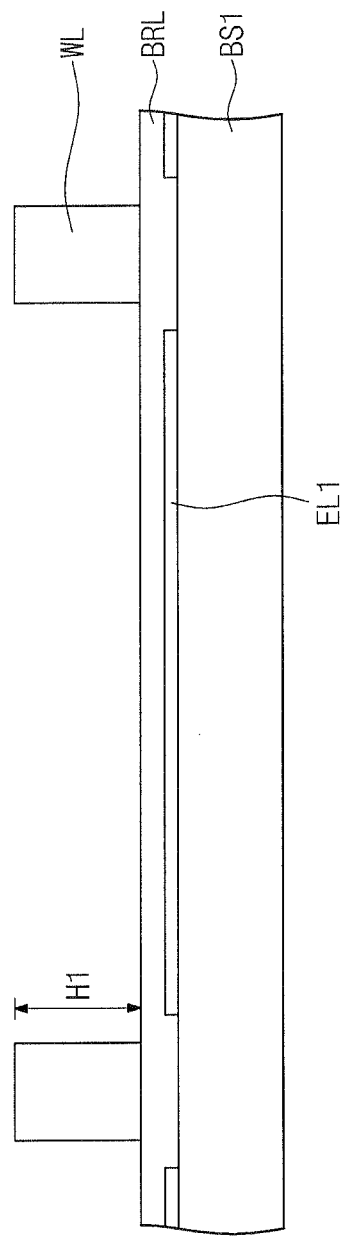
Figure 6G:
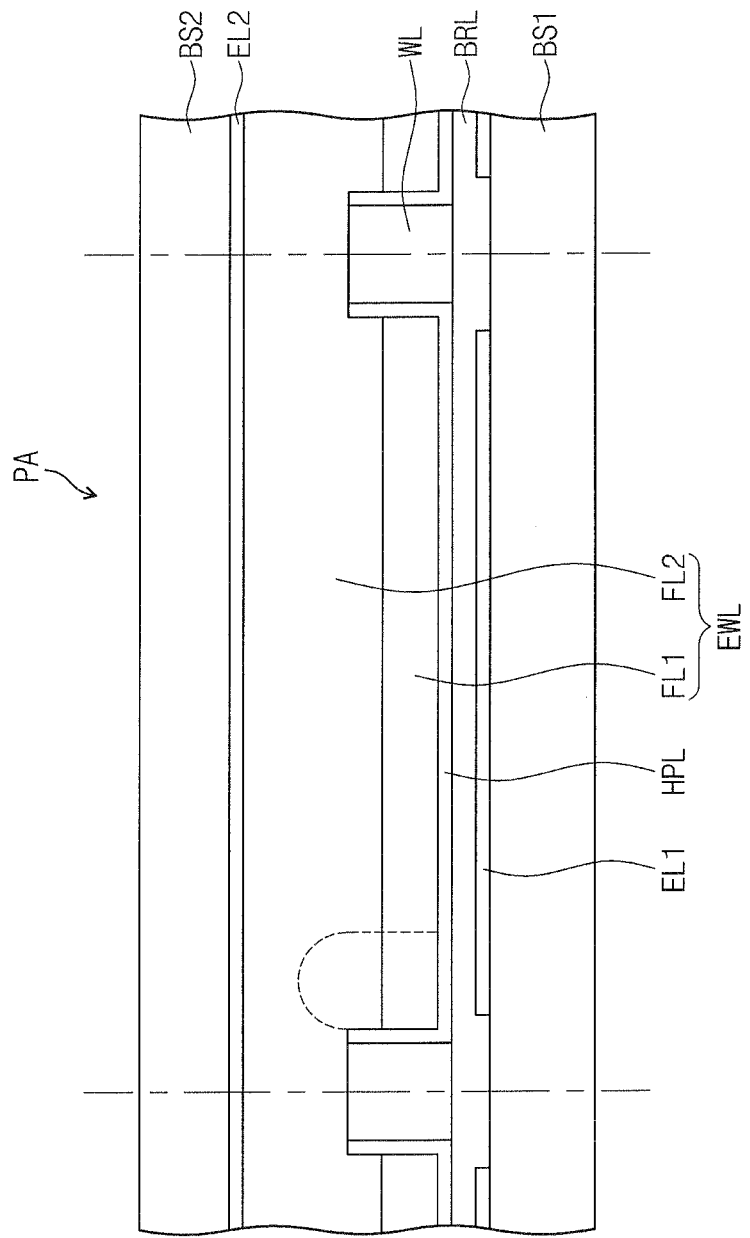

Then, referring to FIG. 6G, the first base substrate BS1 with the electrowetting layer EWL, e.g., an array substrate, is coupled with the second base substrate BS2 with the second electrode EL2, e.g., an opposite substrate, thus forming the electrowetting display device.

Figure 8:
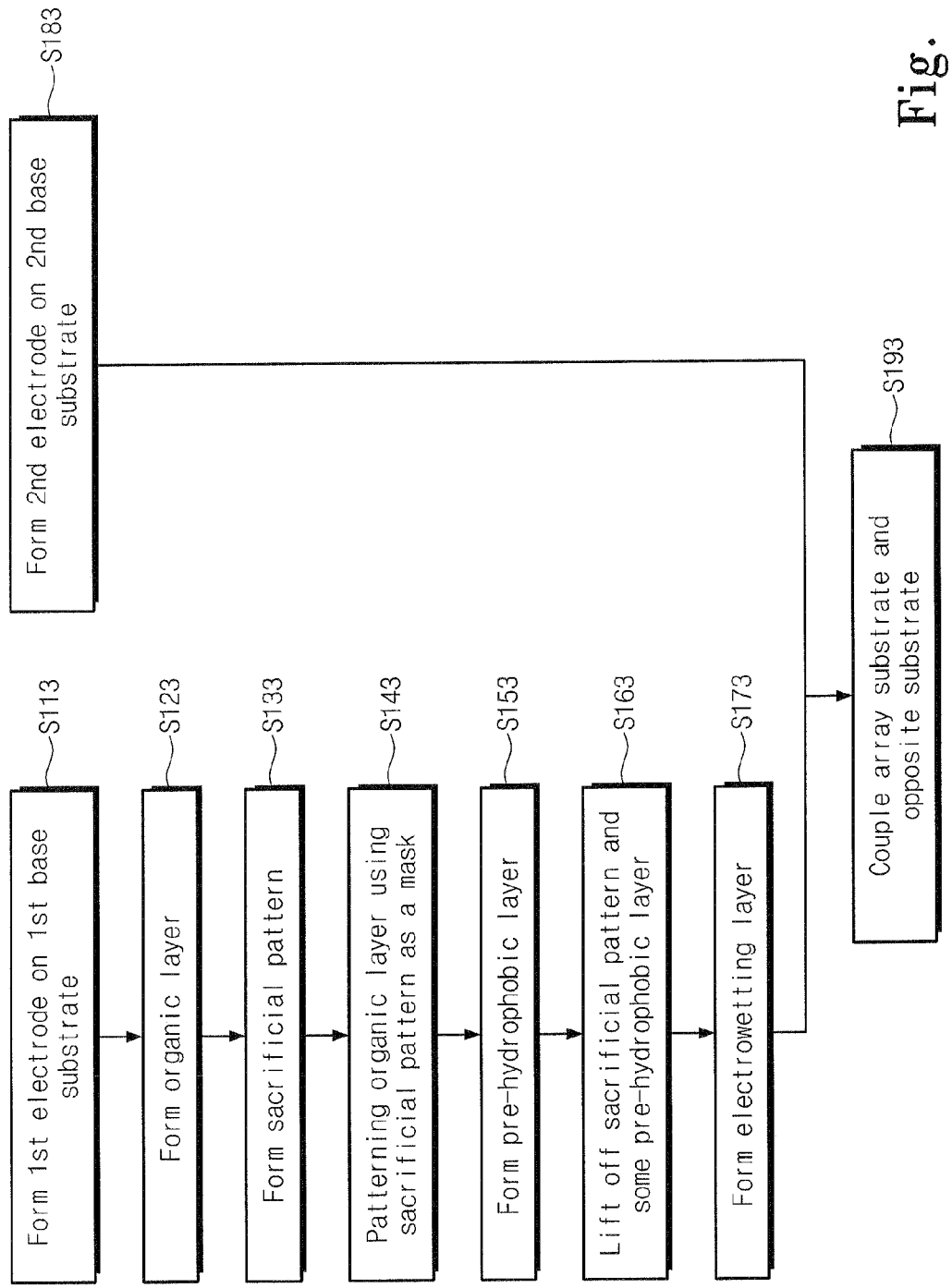
FIG. 8 is a flowchart showing a method of manufacturing the electrowetting display device shown in FIG. 1.

FIG. 8 is a flowchart showing a method of manufacturing the electrowetting display device shown in FIG. 1. FIGS. 9A to 9G are cross-sectional views showing the method of manufacturing the electrowetting display device shown in FIG. 8.

Referring to FIG. 8, the electrowetting display device is manufactured by forming an array substrate and an opposite substrate and by coupling the array substrate with the opposite substrate.

Forming the array substrate includes forming a first electrode on the first base substrate (S113), forming an organic layer (S123), forming a sacrificial pattern on the organic layer (S133), patterning the organic layer using the sacrificial pattern as a mask to form a wall (S143), forming a pre-hydrophobic layer on the first base substrate (S153), lifting off the sacrificial pattern and a portion of the pre-hydrophobic layer (S163), and forming the electrowetting layer (S173). Forming the opposite substrate includes forming the second electrode on the second base substrate (S183). The array substrate and the opposite substrate are coupled to face each other, with the electrowetting layer between the array substrate and the opposite substrate (S193).

Hereinafter, the method of manufacturing the electrowetting display device will be described in greater detail with reference to FIGS. 1, 8, and 9A to 9G.

Referring to 9A, a first base substrate BS1 is prepared, and a switching device and a first electrode EL1 are formed on the first base substrate BS1. The switching device is connected with the first electrode EL1.

According to an embodiment, a barrier layer BRL is formed on the first base substrate BS1 on which the first electrode EL1 is formed. According to an embodiment, the barrier layer BRL has a single-layered structure or a multi-layered structure.

Next, referring to 9B, an organic layer OGL and a sacrificial layer SCL1 are sequentially stacked on the barrier layer BRL. The organic layer OGL and the sacrificial layer SCL1 include different materials having different etching rates from each other with respect to etching conditions, such as type of etchants, etching temperature, or consumed etching time.

According to an embodiment, the organic layer OGL includes an organic polymer. According to an embodiment, the organic polymer contains a hydrophilic material or a hydrophilic functional group to form the wall WL having a hydrophilic property. According to an embodiment, the sacrificial layer SCL1 includes a photosensitive organic polymer. In an exemplary embodiment, a positive type photoresist is used as the photosensitive organic polymer.

Referring to FIG. 9C, a sacrificial pattern SCP1 is formed on the organic layer OGL. The sacrificial pattern SCP1 is formed by patterning the sacrificial layer SCL1 using a photolithography process. For example, the sacrificial pattern SCP1 is formed by exposing and developing the sacrificial layer SCL1 containing the photosensitive organic polymer.

Since the sacrificial layer SCL1 includes the positive type photoresist, the exposed portion is removed after the exposure and the development processes. The sacrificial pattern SCP1 has a top surface having an area smaller than an area of a bottom surface. When a width of the top surface is referred to as a first width W1 and a width of the bottom surface is referred to as a second width W2 in a cross-sectional view, the first width W1 is smaller than the second width W2.

Referring to FIG. 9D, a wall WL is formed by patterning the organic layer OGL. The organic layer OGL is patterned by a dry etching scheme or a wet etching scheme. For example, the dry etching scheme uses the sacrificial pattern SCP1 as a mask. A portion of the wall WL other than an area where the sacrificial pattern SCP1 is formed is etched, so that the top surface of the wall WL is covered by the sacrificial pattern SCP1, and the lateral surface of the wall WL is exposed to the exterior. The top surface of the wall WL has a smaller area than an area of the bottom surface of the sacrificial pattern SCP1 according to a difference in etch rates between the wall WL and the sacrificial pattern SCP1 and/or an etch direction of the wall WL and the sacrificial pattern SCP1. Accordingly, a width of the wall WL is smaller than the second width W2 of the sacrificial pattern SCP1.

Next, referring to FIG. 9E, the pre-hydrophobic layer P_HPL is formed on the first base substrate BS1 on which the wall WL is formed. The pre-hydrophobic layer P_HPL covers a portion of the top surface of the first base substrate BS1, the lateral surface of the wall WL, and the top and lateral surfaces of the sacrificial pattern SCP1. Since the width of the wall WL is smaller than the second width W2 of the sacrificial pattern SCP1 in a cross-sectional view, part of the bottom surface of the sacrificial layer SCP1 is exposed to the exterior, and accordingly, the pre-hydrophobic layer P_HPL may not be formed or formed relatively thin on the lateral surface of the wall WL below the sacrificial pattern SCP1.

The pre-hydrophobic layer P_HPL may include a compound containing fluorine so that the surface of the pre-hydrophobic layer P_HPL has a hydrophobic property. The pre-hydrophobic layer P_HPL may be formed by depositing or coating a hydrophobic material on the first base substrate BS1 but is not limited thereto or thereby. For example, according to an embodiment, the pre-hydrophobic layer P_HPL may be formed by an ink jet scheme.

Then, referring to FIG. 9F, the first base substrate BS1 on which the pre-hydrophobic layer P_HPL is formed is dipped into a strip solution, so that the sacrificial pattern SCP1 and the portion of the pre-hydrophobic layer P_HPL which is formed on the top surface and the lateral surface of the sacrificial pattern SCP1 are lifted off and removed, thereby resulting in a hydrophobic layer HPL. Since the strip solution easily penetrate into the surface of the wall WL in an area where the pre-hydrophobic layer P_HPL is not formed or formed relatively thin, the sacrificial pattern SCP1 can be lifted off easily from the top surface of the wall WL. After the lifting off process, the hydrophobic layer HPL remains on the lateral surface of the wall WL, and the top surface of the wall WL is exposed to the exterior.

Next, an electrowetting layer EWL is formed on the first base substrate BS1 on which the hydrophobic layer HPL and the wall WL are formed. The electrowetting layer EWL may be formed by coating the first fluid FL1 and the second fluid FL2 on the first base substrate BS1. The first fluid FL1 and the second fluid FL2 can be coated in various ways, for example, by dipping the first base substrate BS1 into the first fluid FL1 and/or the second fluid FL2.

The second electrode EL2 is formed on the second base substrate BS2 facing the first base substrate BS1.

Figure 9A:
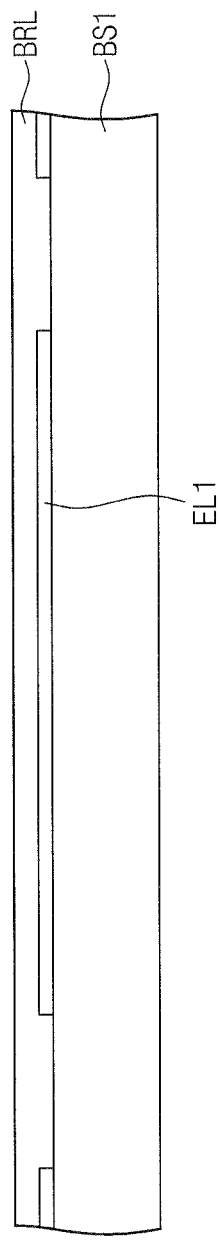
Figure 9B:
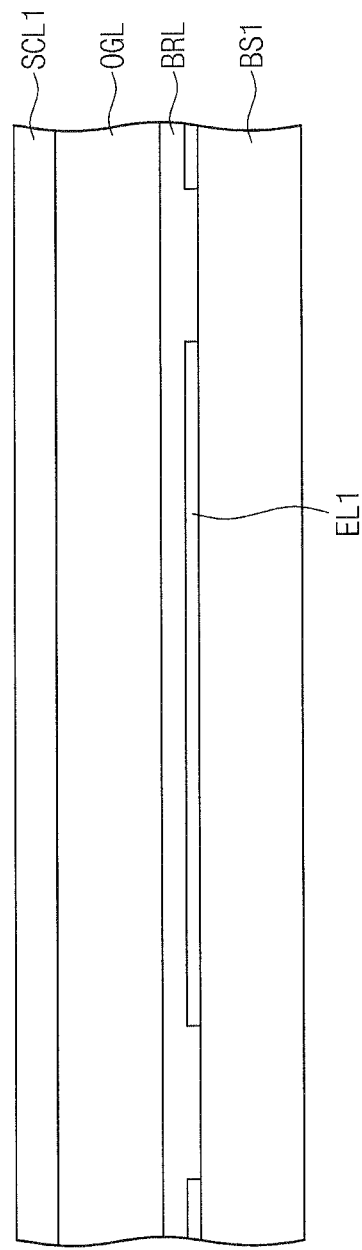
Figure 9G:
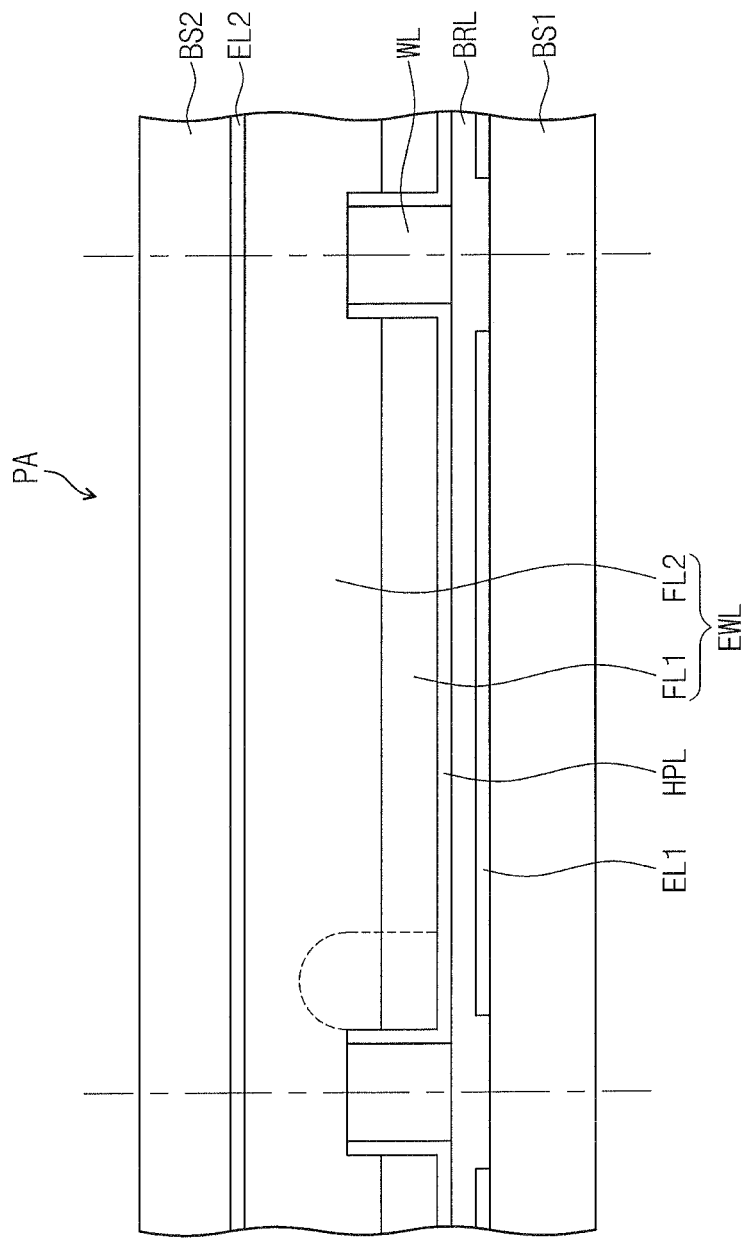

Then, referring to FIG. 9G, the first base substrate BS1 with the electrowetting layer EWL, e.g., the array substrate, is coupled with the second base substrate BS2 with the second electrode EL2, e.g., the opposite substrate, thereby forming the electrowetting display device.

FIGS. 10A to 10G are cross-sectional views showing a method of manufacturing the electrowetting display device shown in FIG. 1.

Hereinafter, the method of manufacturing the electrowetting display device is described in detail with reference to FIGS. 8, and 10A to 10G.

Referring to 10A, a first base substrate BS1 is prepared, and a switching device and a first electrode EL1 are formed on the first base substrate BS1. The switching device is connected with the first electrode EL1.

According to an embodiment, a barrier layer BRL is formed on the first base substrate BS1 on which the first electrode EL1 is formed. According to an embodiment, the barrier layer BRL has a single-layered structure or a multi-layered structure.

Next, referring to 10B, an organic layer OGL and a sacrificial layer SCL2 are sequentially stacked on the barrier layer BRL. The organic layer OGL and the sacrificial layer SCL2 have different materials having different etching rates from each other with respect to etching conditions, such as type of etchants, etching temperature, or consumed etching time.

According to an embodiment, the organic layer OGL includes an organic polymer. The organic polymer contains a hydrophilic material or a hydrophilic functional group to form the wall WL having a hydrophilic property. According to an embodiment, the sacrificial layer SCL2 includes a photosensitive organic polymer. In an exemplary embodiment, a negative type photoresist is used as the photosensitive organic polymer.

Referring to FIG. 10C, a sacrificial pattern SCP2 is formed on the organic layer OGL. According to an embodiment, the sacrificial pattern SCP2 is formed by patterning the sacrificial layer SCL2 using a photolithography process. For example, the sacrificial pattern SCP2 is formed by exposing and developing the sacrificial layer SCL2 containing the photosensitive organic polymer.

Since the sacrificial layer SCL2 includes the negative type photoresist, a portion other than the exposed portion is removed after the exposure and the development processes. A top surface of the sacrificial pattern SCP2 has an area larger than an area of a bottom surface thereof. When a width of the top surface of the sacrificial pattern SCP2 is referred to as a third width W3 and a width of the bottom surface the sacrificial pattern SCP2 is referred to as a fourth width W4 in a cross-sectional view, the third width W3 is larger than the fourth width W4.

Referring to FIG. 10D, a wall WL is formed by patterning the organic layer OGL. According to an embodiment, the organic layer OGL is patterned by a dry etching scheme or a wet etching scheme. The dry etching scheme uses the sacrificial pattern SCP2 as a mask. A portion of the wall WL other than a portion where the sacrificial pattern SCP2 is formed is etched, so that the top surface of the wall WL is covered by the sacrificial pattern SCP2, and the lateral surface of the wall WL is exposed to the exterior. According to an embodiment, the top surface of the wall WL has a smaller area than an area of the top surface of the sacrificial pattern SCP2 according to a difference in etch rates between the wall WL and the sacrificial pattern SCP2 and/or an etch direction of the wall WL and the sacrificial pattern SCP2. Accordingly, a width of the top surface of the wall WL is smaller than the third width W3 of the sacrificial pattern SCP2 in a cross-sectional view.

Next, referring to FIG. 10E, the pre-hydrophobic layer P_HPL is formed on the first base substrate BS1 on which the wall WL is formed. The pre-hydrophobic layer P_HPL covers a portion of the top surface of the first base substrate BS1, the lateral surface of the wall WL, and the top surface of the sacrificial pattern SCP2. Since the third width W3 of the sacrificial pattern SCP2 is larger than the fourth width W4 of the sacrificial pattern SCP2, the pre-hydrophobic layer P_HPL may not be formed or formed relatively thin on the lateral surface of the sacrificial pattern SCP2. Since the width of the wall WL is smaller than the third width W3 of the sacrificial pattern SCP2, the pre-hydrophobic layer P_HPL may not be formed or formed relatively thin on the lateral surface of the wall WL below the sacrificial pattern SCP2.

According to an embodiment, the pre-hydrophobic layer P_HPL includes a compound containing fluorine so that the surface of the pre-hydrophobic layer P_HPL has a hydrophobic property. According to an embodiment, the pre-hydrophobic layer P_HPL is formed by depositing or coating a hydrophobic material on the first base substrate BS1 but is not limited thereto or thereby. For example, according to an embodiment, the pre-hydrophobic layer P_HPL is formed by an ink-jet scheme.

Then, referring to FIG. 10F, the first base substrate BS1 on which the pre-hydrophobic layer P_HPL is formed is dipped into a strip solution, so that the sacrificial pattern SCP2 and the portion of the pre-hydrophobic layer P_HPL which is formed on the top surface of the sacrificial pattern SCP2 are lifted off and removed, thereby resulting in a hydrophobic layer HPL. Since the strip solution may easily penetrate into the surface of the wall WL where the pre-hydrophobic layer P_HPL is not formed or formed relatively thin, the sacrificial pattern SCP2 can be easily lifted off from the top surface of the wall WL. After the lifting off process, the hydrophobic layer HPL remains on the lateral surface of the wall WL, and the top surface of the wall WL is exposed to the exterior.

Next, an electrowetting layer EWL is formed on the first base substrate BS1 on which the hydrophobic layer HPL and the wall WL are formed. According to an embodiment, the electrowetting layer EWL is formed by coating the first fluid FL1 and the second fluid FL2 on the first base substrate BS1. The first fluid FL1 and the second fluid FL2 can be coated in various ways, for example, by dipping the first base substrate BS1 into the first fluid FL1 and/or the second fluid FL2.

The second electrode EL2 is formed on the second base substrate BS2 facing the first base substrate BS1.

Figure 10A:
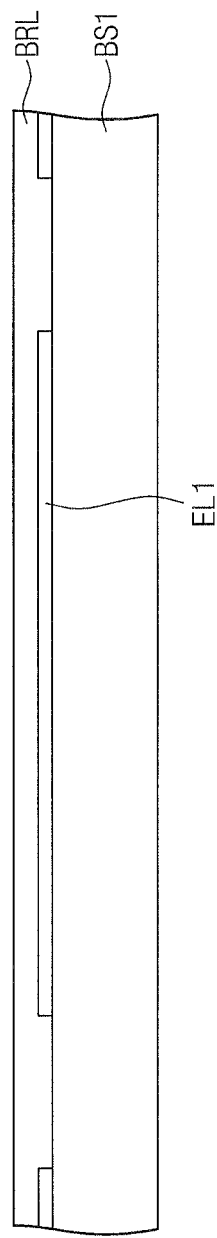
Figure 10B:
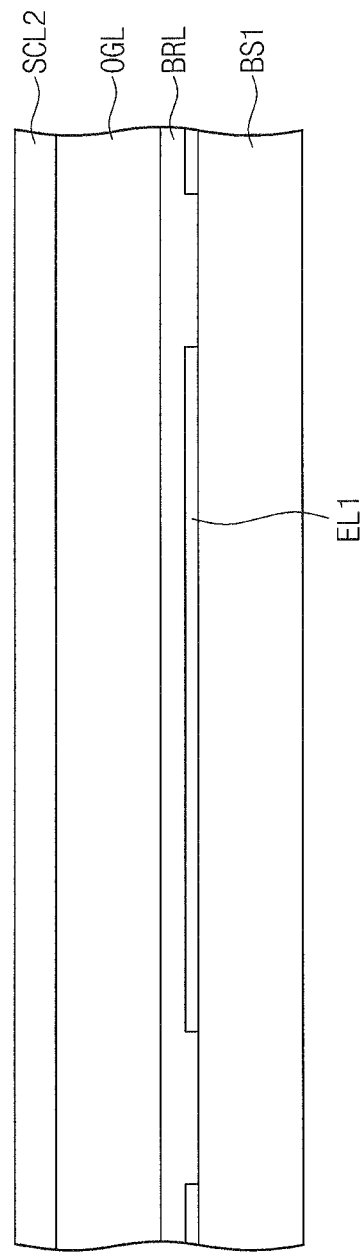
Figure 10G:
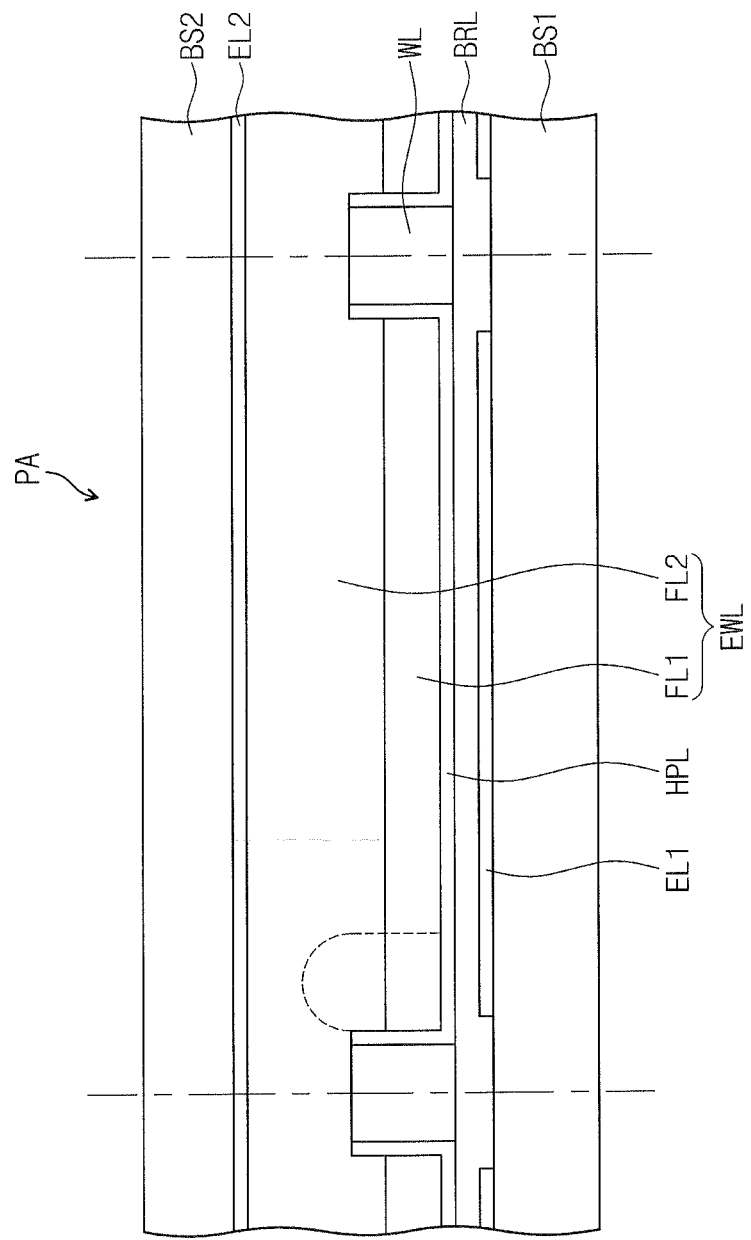

Then, referring to FIG. 10G, the first base substrate BS1 with the electrowetting layer EWL, e.g., the array substrate, is coupled with the second base substrate BS2 with the second electrode EL2, e.g., the opposite substrate, thus forming the electrowetting display device.

The organic layer OGL which forms the wall WL is not a photosensitive material, but is not limited thereto. According to an exemplary embodiment, the organic layer OGL includes a negative type photosensitive organic material. In an embodiment, the sacrificial pattern SCP2, together with the wall WL, can be formed through a single step process.

Hereinafter, a method of manufacturing an electrowetting display device according to an exemplary embodiment will be described in detail with reference to FIG. 8, FIG. 10A, FIG. 10B, and FIG. 10D to FIG. 10G.

Referring to 10A, a first base substrate BS1 is prepared, and a switching device and a first electrode EL1 are formed on the first base substrate BS1. The switching device is connected with the first electrode EL1.

According to an embodiment, a barrier layer BRL is formed on the first base substrate BS1 on which the first electrode EL1 is formed. According to an embodiment, the barrier layer BRL has a single-layered structure or a multi-layered structure.

Next, referring to 10B, an organic layer OGL and a sacrificial layer SCL2 are sequentially stacked on the barrier layer BRL. According to an embodiment, the organic layer OGL and the sacrificial layer SCL2 have different materials having different etching rates from each other with respect to etching conditions.

The organic layer OGL includes a negative type photosensitive organic polymer. According to an embodiment, the negative type photosensitive organic polymer contains a hydrophilic material or a hydrophilic functional group to form a wall WL having a hydrophilic property. The sacrificial layer SCL2 includes a negative type photosensitive organic polymer. In an exemplary embodiment, when the negative type photosensitive organic polymer for the organic layer OGL is referred to as the first photosensitive organic polymer, and the negative type photosensitive organic polymer for the sacrificial layer SCL2 is referred to as the second photosensitive organic polymer, the first and second photosensitive organic polymers may respectively include different materials from each other and respectively have different etch rates from each other according to etching conditions.

Referring to FIG. 10D, the organic layer OGL and the sacrificial layer SCL2 are simultaneously patterned to form the wall WL and a sacrificial pattern SCP2. Accordingly, the step described in connection with FIG. 10C may be omitted.

The wall WL and the sacrificial pattern SCP2 are formed by a photolithography process. For example, the wall WL and the sacrificial pattern SCP2 are formed by simultaneously exposing and developing the organic layer OGL and the sacrificial layer SCL2 having the first and second photosensitive organic polymers, respectively. Since the organic layer OGL and the sacrificial layer SCL2 include negative type photoresists, portions of the organic layer OGL and the sacrificial layer SCL2 which are not exposed are removed. Since the organic layer OGL and the sacrificial layer SCL2 can be formed by the single process, time and costs for manufacturing the electrowetting display device are reduced.

The sacrificial pattern SCP2 includes a top surface having a larger area than an area of a bottom surface thereof. When the sacrificial pattern SCP2 and the wall WL have different materials having different etch rates, the sacrificial pattern SCP2 and the wall WL can be patterned to have different shapes with different etch degrees from each other by controlling the etching conditions.

Next, referring to FIG. 10E, the pre-hydrophobic layer P_HPL is formed on the first base substrate BS1 on which the wall WL and the sacrificial pattern SCP2 are formed. The pre-hydrophobic layer P_HPL covers a portion of the top surface of the first base substrate BS1, the lateral surface of the wall WL, and the top surface of the sacrificial pattern SCP2. The pre-hydrophobic layer P_HPL may not be formed or formed relatively thin on the lateral surface of the sacrificial pattern SCP2 in a cross-sectional view. Since the width of the wall WL is smaller than the third width W3 of the sacrificial pattern SCP2, the pre-hydrophobic layer P_HPL may not be formed or formed relatively thin on the lateral surface of the wall WL below the lateral surface of the sacrificial pattern SCP2.

Then, referring to FIG. 10F, the first base substrate BS1 on which the pre-hydrophobic layer P_HPL is formed is dipped into a strip solution, so that the sacrificial pattern SCP2 and the portion of the pre-hydrophobic layer P_HPL formed on the top surface of the sacrificial pattern SCP2 are lifted off and removed, thereby forming the wall WL. Since the strip solution may easily penetrate into the surface of the wall WL where the pre-hydrophobic layer P_HPL is not formed or formed relatively thin, the sacrificial pattern SCP2 can be easily lifted off from the top surface of the wall WL. After the lifting off process, the hydrophobic layer HPL remains on the lateral surface of the wall WL, and the top surface of the wall WL is exposed to the exterior.

Next, an electrowetting layer EWL is formed on the first base substrate BS1 on which the hydrophobic layer HPL and the wall WL are formed. According to an embodiment, the electrowetting layer EWL is formed by coating the first fluid FL1 and the second fluid FL2 on the first base substrate BS1. The first fluid FL1 and the second fluid FL2 can be coated in various ways, for example, by dipping the first base substrate BS1 into the first fluid FL1 and/or the second fluid FL2.

The second electrode EL2 is formed on the second base substrate BS2 facing the first base substrate BS1.

Then, referring to FIG. 10G, the first base substrate BS1 with the electrowetting layer EWL, e.g., the array substrate, is coupled to the second base substrate BS2 with the second electrode EL2, e.g., the opposite substrate, thus forming the electrowetting display device.

According to an exemplary embodiment, a metal layer is used instead of the negative type photosensitive organic layer for forming the sacrificial pattern. Hereinafter, a method of manufacturing an electrowetting display device according to an embodiment is described in detail with reference to FIGS. 8, and 10A to 10G.

Referring to 10A, a first base substrate BS1 is prepared, and a switching device and a first electrode EL1 are formed on the first base substrate BS1. The switching device is connected with the first electrode EL1.

According to an embodiment, a barrier layer BRL is formed on the first base substrate BS1 on which the first electrode EL1 is formed. According to an embodiment, the barrier layer BRL has a single-layered structure or a multi-layered structure.

Next, referring to 10B, an organic layer OGL and a sacrificial layer SCL2 are sequentially stacked on the barrier layer BRL.

The organic layer OGL includes an organic polymer. According to an embodiment, the organic polymer contains a hydrophilic material or a hydrophilic functional group to form the wall WL having a hydrophilic property. The sacrificial layer SCL2 includes a metal and has a thickness less than a thickness of the organic layer OGL.

Referring to FIG. 10C, a sacrificial pattern SCP2 is formed on the organic layer OGL. According to an embodiment, the sacrificial pattern SCP2 is formed by patterning the sacrificial layer SCL2 using a photolithography process. For example, the sacrificial pattern SCP2 is formed by forming an additional photoresist on the sacrificial layer SCP2, exposing and developing the additional photoresist to form an additional photoresist pattern, patterning the sacrificial layer SCL2 using the additional photoresist pattern as a mask, and removing the additional photoresist pattern by stripping. Accordingly, the sacrificial pattern SCP2 which includes a top surface having a larger area than an area of a bottom surface thereof is formed as shown in FIG. 10C.

Referring to FIG. 10D, a wall WL is formed by patterning the organic layer OGL. According to an embodiment, the organic layer OGL is patterned by a dry etching scheme or a wet etching scheme. The dry etching scheme uses the sacrificial pattern SCP2. A remaining portion of the wall WL other than a portion on which the sacrificial pattern SCP2 is formed is etched, so that the top surface of the wall WL is covered by the sacrificial pattern SCP2, and the lateral surface of the wall WL is exposed to the exterior.

Next, referring to FIG. 10E, the pre-hydrophobic layer P_HPL is formed on the first base substrate BS1 on which the wall WL and the sacrificial pattern SCP2 are formed. The pre-hydrophobic layer P_HPL covers a portion of the top surface of the first base substrate BS1, the lateral surface of the wall WL, and the top surface of the sacrificial pattern SCP2.

The pre-hydrophobic layer P_HPL may not be formed or formed relatively thin on the lateral surface of the sacrificial pattern SCP2. The pre-hydrophobic layer P_HPL may not be formed or formed relatively thin on the lateral surface of the wall WL below the lateral surface of the sacrificial pattern SCP2.

According to an embodiment, the pre-hydrophobic layer P_HPL includes a compound containing fluorine so that the surface of the pre-hydrophobic layer P_HPL has a hydrophobic property. According to an embodiment, the pre-hydrophobic layer P_HPL is formed by depositing or coating a hydrophobic material on the first base substrate BS1 but is not limited thereto or thereby. For example, according to an embodiment, the pre-hydrophobic layer P_HPL is formed by an ink-jet scheme.

Then, referring to FIG. 10F, the first base substrate BS1 on which the pre-hydrophobic layer P_HPL is formed is dipped into a strip solution, so that the sacrificial pattern SCP2 and the portion of the pre-hydrophobic layer P_HPL formed on the top surface of the sacrificial pattern SCP2 are lifted off and removed, thereby forming a hydrophobic layer HPL. Since the strip solution may easily penetrate into the surface of the wall WL where the pre-hydrophobic layer P_HPL is not formed or formed relatively thin, the sacrificial pattern SCP can be easily lifted off from the top surface of the wall WL. After the lifting off process, the hydrophobic layer HPL remains on the lateral surface of the wall WL, and the top surface of the wall WL is exposed to the exterior.

Next, the electrowetting layer EWL is formed on the first base substrate BS1 on which the hydrophobic layer HPL and the wall WL are formed. According to an embodiment, the electrowetting layer EWL is formed by coating the first fluid FL1 and the second fluid FL2 on the first base substrate BS1. The first fluid FL1 and the second fluid FL2 can be coated in various ways, for example, by dipping the first base substrate BS1 into the first fluid FL1 and/or the second fluid FL2.

The second electrode EL2 is formed on the second base substrate BS2 facing the first base substrate BS1.

Then, referring to FIG. 10G, the first base substrate BS1 with the electrowetting layer EWL, e.g., the array substrate, is coupled to the second base substrate BS2 with the second electrode EL2, e.g., the opposite substrate, thus forming the electrowetting display device.

According to an exemplary embodiments of the invention, a plasma treating process is omitted when manufacturing the electrowetting display device. Generally, a wall is formed after forming a hydrophobic layer in a conventional electrowetting display device. However, since the hydrophobic layer has a hydrophobic property and the wall has a hydrophilic property, adhesiveness between the hydrophobic layer and the wall may decrease. Thus, to increase adhesiveness between the hydrophobic layer and the wall, a plasma treatment may be carried out on the surface of the hydrophobic layer. A reflow process may be performed to remove hydrophilic functional groups created on the surface of the hydrophobic layer by the plasma treatment after forming the wall. Non-closing defects may occur after the reflow treatment and the plasma treatment are performed. The non-closing defects mean that the first fluid does not completely cover the hydrophobic layer when a voltage is applied to or not applied to each pixel and a black state is not normally represented. The non-closing defects may be caused by the residues generated during the processes performed after the hydrophobic layer is formed or by the hydrophilic functional groups that are not removed from the hydrophobic layer. The non-closing defects may be caused by hydrophilic functional groups generated by a reaction between the hydrophilic functional groups generated during the plasma treatment on the hydrophobic layer and functional groups of a material for the wall. For instance, when the hydrophobic layer is plasma-treated, —OH group or —COOH group may be adsorbed onto a tip of the polymer and —OH group or —COOH group reacts with other functional groups of the wall, thereby causing other hydrophilic functional groups. Therefore, a display quality of the electrowetting display device is degraded and durability thereof is reduced.

The plasma treatment and the reflow treatment are omitted in the embodiments of the present invention, so that not only defects but also manufacturing time and costs may be reduced.

Although the exemplary embodiments of the invention have been described, it is understood that the present invention should not be limited to these exemplary embodiments but various changes and modifications can be made by one ordinary skilled in the art within the spirit and scope of the invention as hereinafter claimed.

What is claimed is:

1. An electrowetting display device comprising:
a base substrate;
an electrowetting layer which comprises a first fluid and a second fluid immiscible with the first fluid, the second fluid having electrical conductivity or polarity;
a wall on the base substrate that at least partially partitions a pixel area;
a hydrophobic layer in the pixel area; and
an electronic device configured to apply an electric field to the electrowetting layer,
wherein the wall comprises a top surface substantially parallel to the base substrate and a lateral surface connecting the base substrate with the top surface such that the lateral surface is substantially perpendicular to the top surface, and
wherein the hydrophobic layer covers the base substrate and the lateral surface of the wall.

2. A method of manufacturing an electrowetting display device, the method comprising:
forming a wall on a base substrate, wherein the wall defines a pixel area;
forming a hydrophobic layer which covers a top surface of the base substrate and a lateral surface of the wall and which exposes a top surface of the wall;
forming an electrowetting layer in the pixel area; and
forming an electronic device configured to control the electrowetting layer.

3. The method of claim 2, wherein forming the hydrophobic layer comprises:
forming a pre-hydrophobic layer on the base substrate where the wall is formed;
shrinking the wall to separate a portion of the pre-hydrophobic layer from the wall; and
removing the separated pre-hydrophobic layer to expose the top surface of the wall.

4. The method of claim 3, wherein shrinking the wall is performed by heating the wall at a first temperature.

5. The method of claim 4, the first temperature is in a range of about 115° C. to about 160° C.

6. The method of claim 4, further comprising:
irradiating a UV ray to the pre-hydrophobic layer to form a crack in the pre-hydrophobic layer.

7. The method of claim 6, wherein the UV ray has a wavelength of about 170 nm or less.

8. The method of claim 4, wherein forming the wall comprises:
coating an organic material on the base substrate to form an organic layer:
patterning the organic layer to form the wall; and
pre-baking the wall at a second temperature.

9. The method of claim 4, further comprising:
irradiating a UV ray to debris of the pre-hydrophobic layer after removing the separated pre-hydrophobic layer.

10. The method of claim 2, wherein forming the wall comprises:
coating an organic material on the base substrate to form an organic layer;
forming a sacrificial pattern on the organic layer; and
patterning the organic layer using the sacrificial pattern as a mask to form the wall.

11. The method of claim 10, wherein the wall is formed by dry-etching the organic layer.

12. The method of claim 10, wherein the sacrificial pattern comprises at least one of a negative type photoresist, a positive type photoresist, or a metal.

13. The method of claim 12, wherein the sacrificial pattern comprises the negative type photoresist or the metal and wherein a top surface of the sacrificial pattern has a greater width than a width of the wall, and a bottom surface of the sacrificial pattern has a same width as the width of the wall.

14. The method of claim 12, wherein the sacrificial pattern comprises the positive type photoresist and wherein a bottom surface of the sacrificial pattern has a greater width than a width of the wall, and a top surface of the sacrificial pattern has a smaller width than the width of the bottom surface.

15. The method of claim 10, wherein forming the hydrophobic layer comprises:
forming the pre-hydrophobic layer on the base substrate where the sacrificial pattern is formed; and
lifting off the sacrificial pattern and the pre-hydrophobic layer on the sacrificial pattern to expose the top surface of the wall.

16. The method of claim 2, wherein forming the wall comprises:
coating an organic material on the base substrate to form an organic layer;
forming a sacrificial layer on the organic layer; and
patterning the organic layer and the sacrificial layer to form the wall.

17. The method of claim 16, wherein at least one of the organic layer or the sacrificial layer comprises a negative type photoresist.

18. The method of claim 2, wherein forming the electronic device comprises:
forming a switching device on the base substrate;
forming a first electrode connected with the switching device; and
forming a second electrode separated from the first electrode.

19. The method of claim 18, wherein the first electrode is disposed on the base substrate.

20. The method of claim 18, further comprising forming an opposite substrate facing the base substrate, wherein the second electrode is formed on the opposite substrate.

* * * * *